April 21, 1959 G. E. COMSTOCK 3D 2,882,745
AUTOMATIC BALANCING MECHANISM FOR ROTATING ELEMENTS
Filed June 9, 1955 9 Sheets-Sheet 1
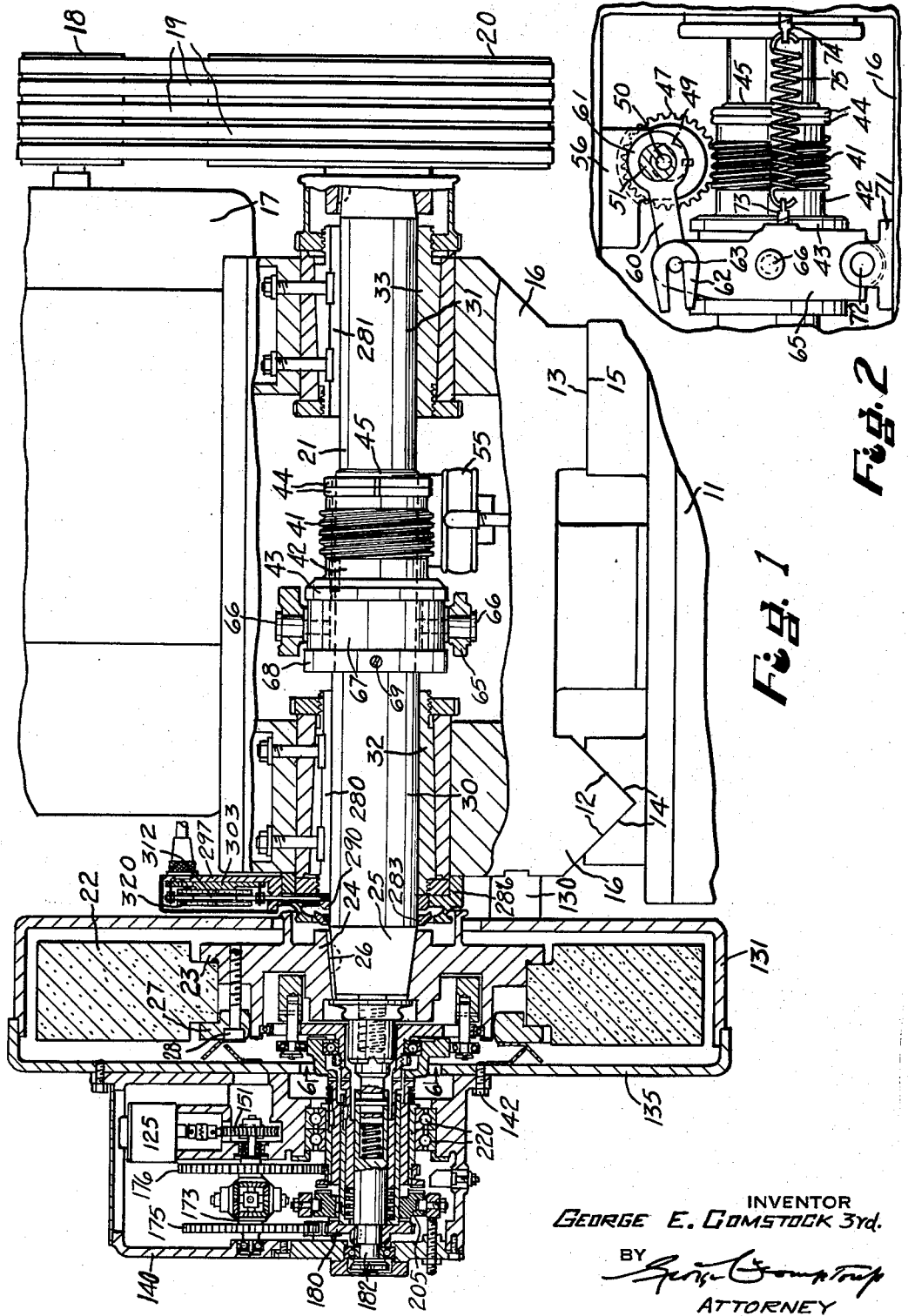
INVENTOR
GEORGE E. COMSTOCK 3rd.
BY
ATTORNEY April 21, 1959     G. E. COMSTOCK 3D     2,882,745
AUTOMATIC BALANCING MECHANISM FOR ROTATING ELEMENTS
Filed June 9, 1955                            9 Sheets-Sheet 2
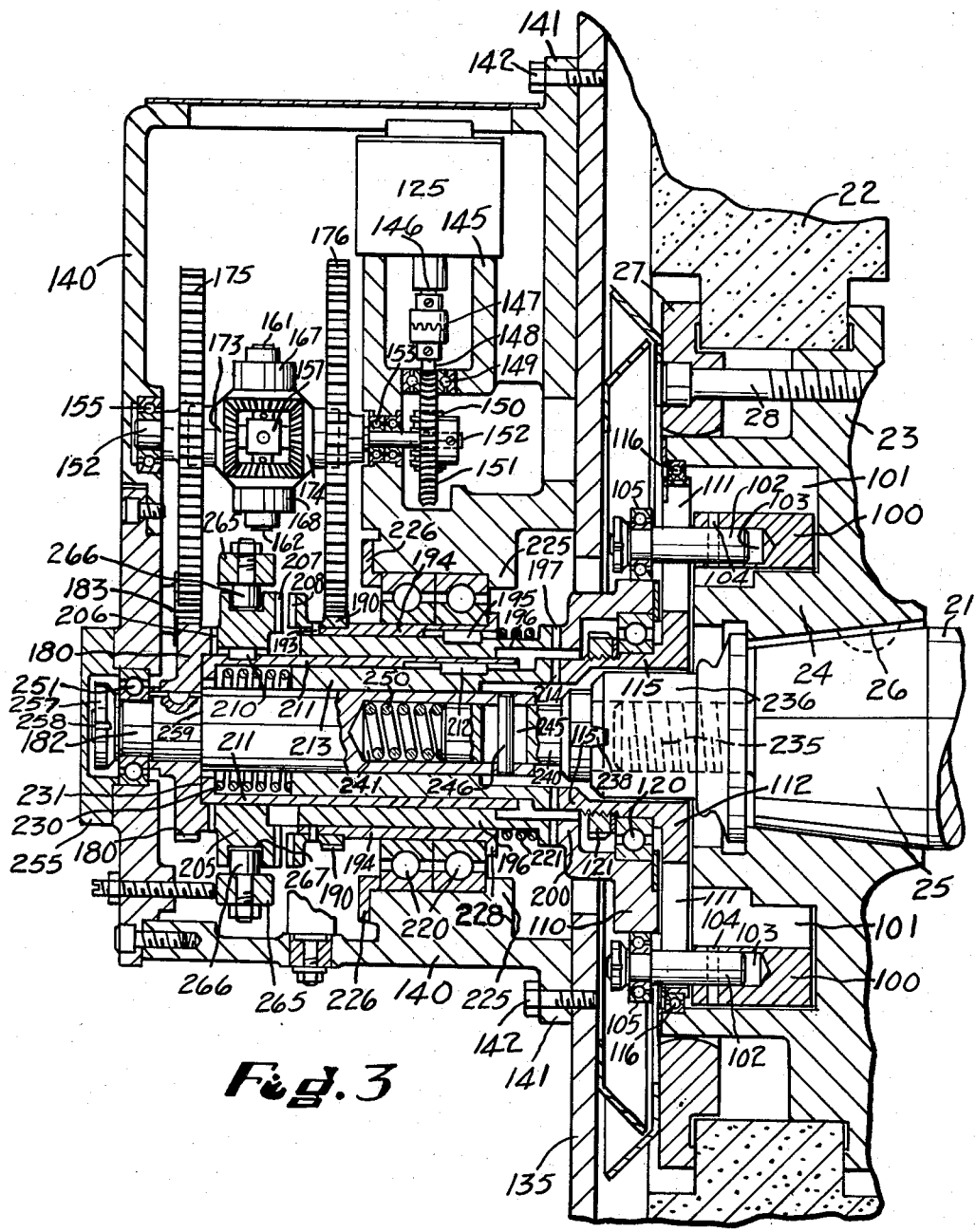
Fig. 3
INVENTOR
GEORGE E. COMSTOCK 3rd.
BY
ATTORNEY April 21, 1959　　　G. E. COMSTOCK 3D　　　2,882,745
AUTOMATIC BALANCING MECHANISM FOR ROTATING ELEMENTS
Filed June 9, 1955　　　　　　　　　　　　　　　9 Sheets-Sheet 3
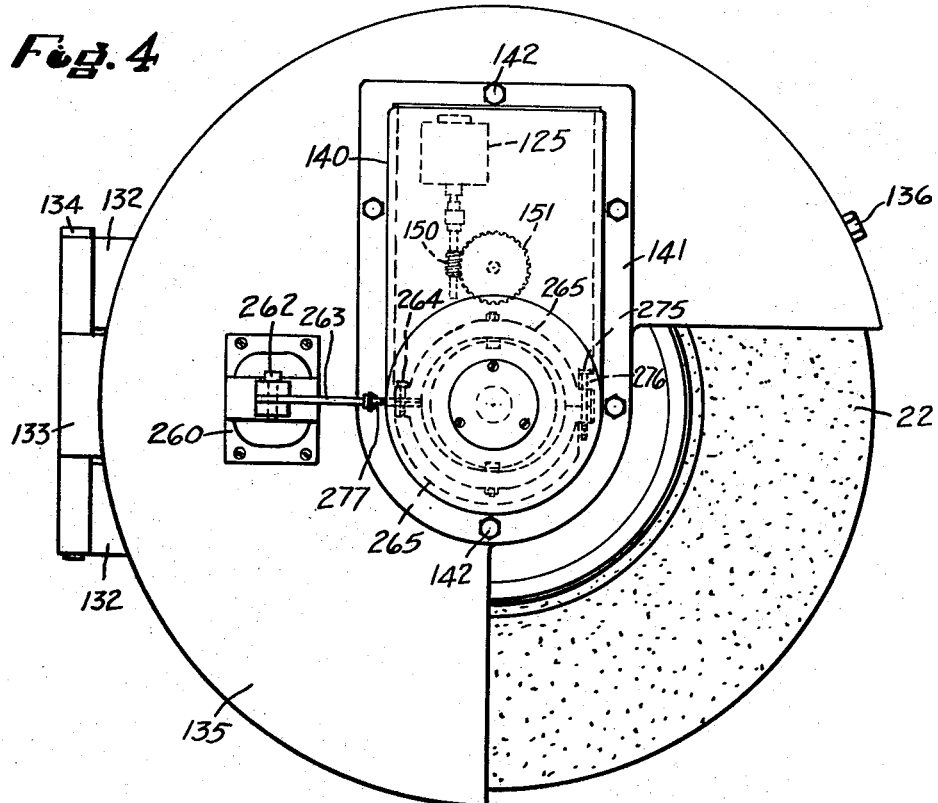
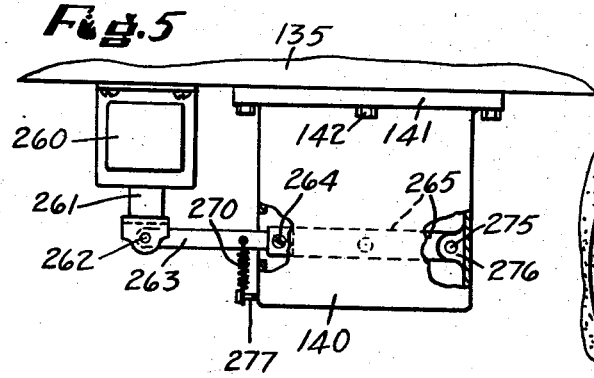
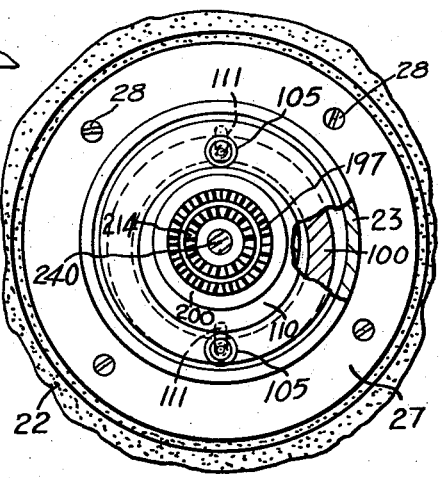
INVENTOR
GEORGE E. COMSTOCK 3rd.
BY
ATTORNEY

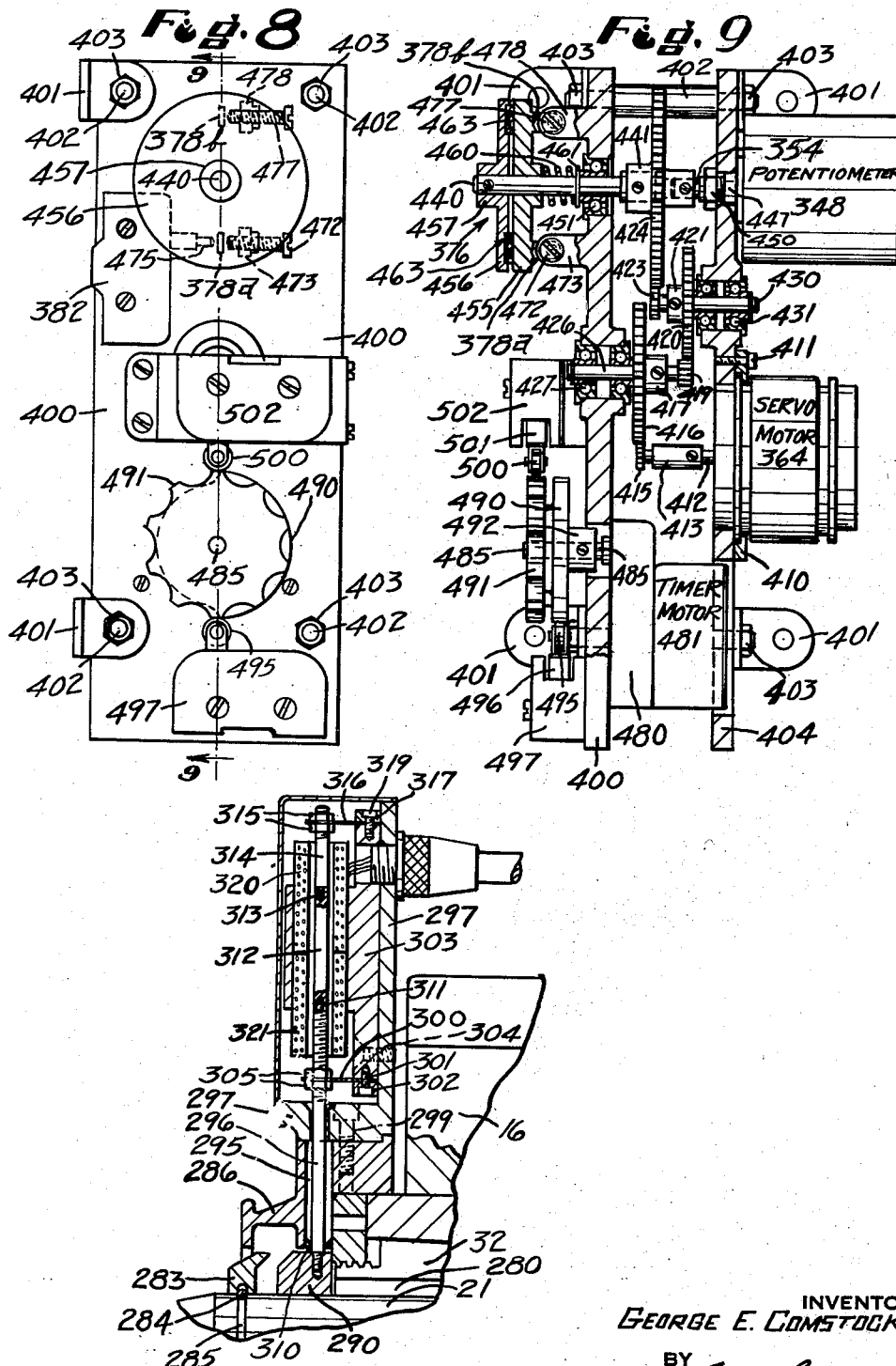

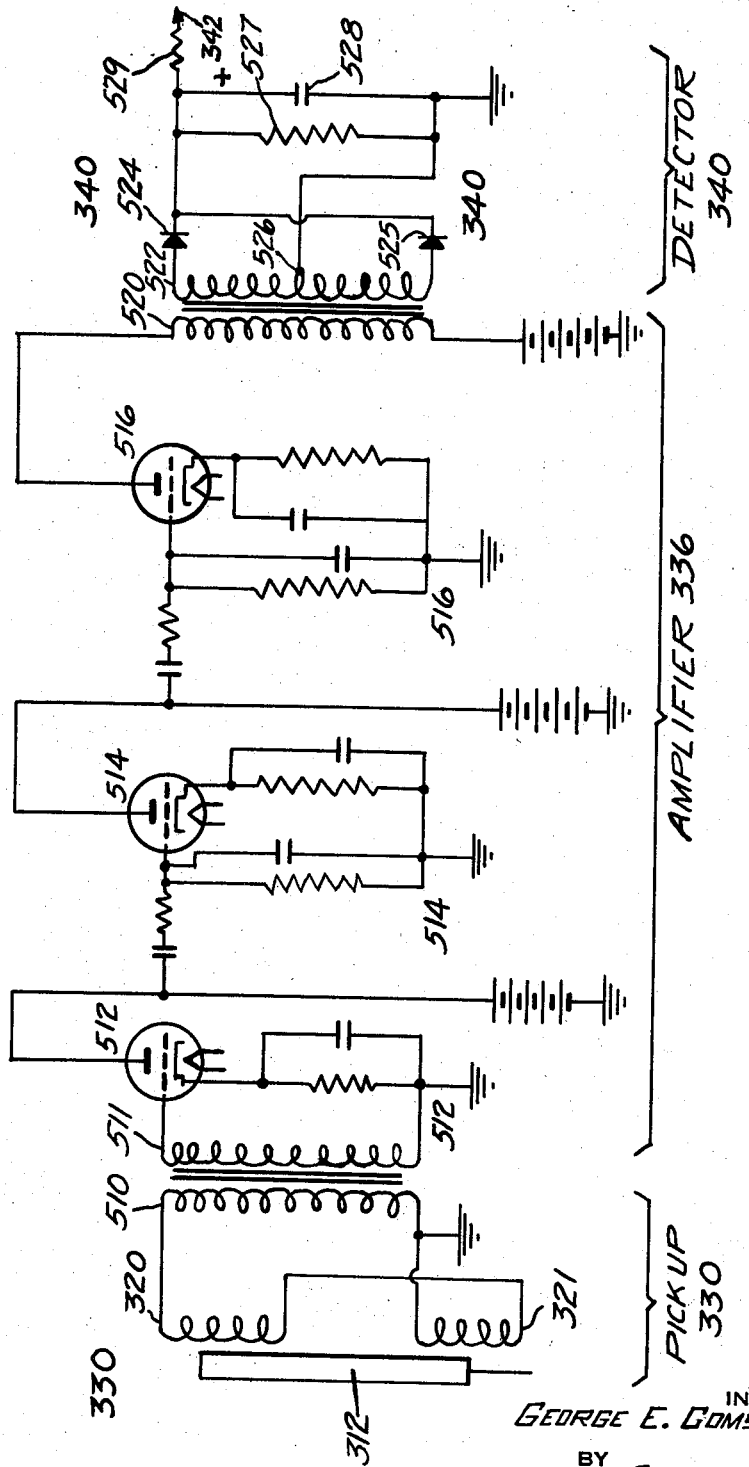

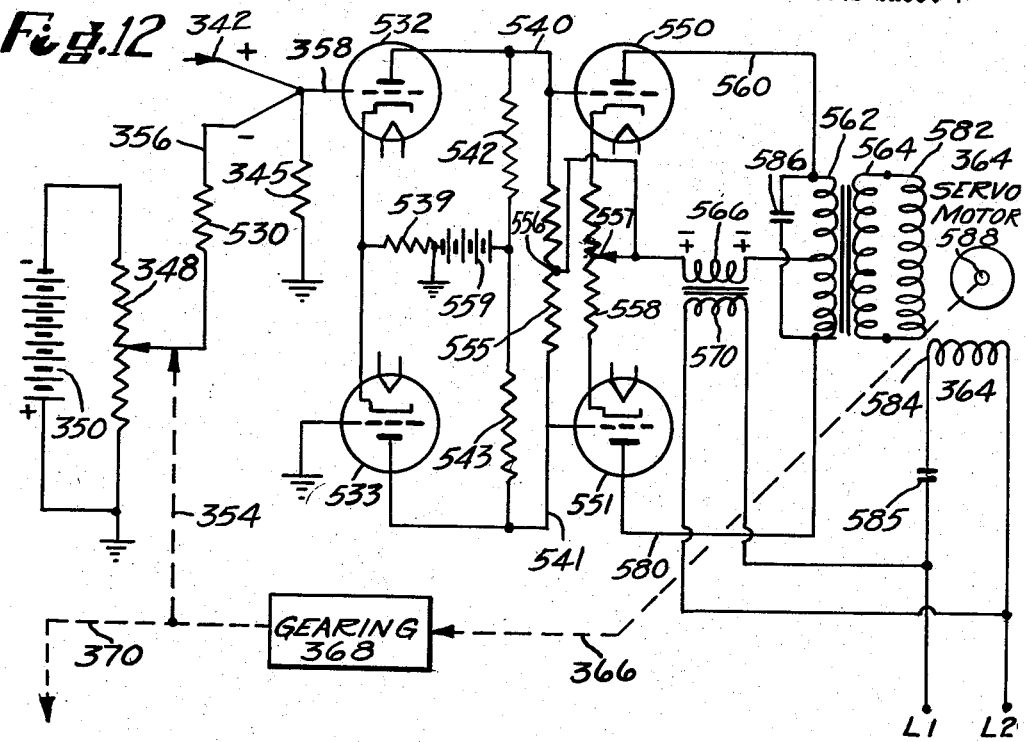
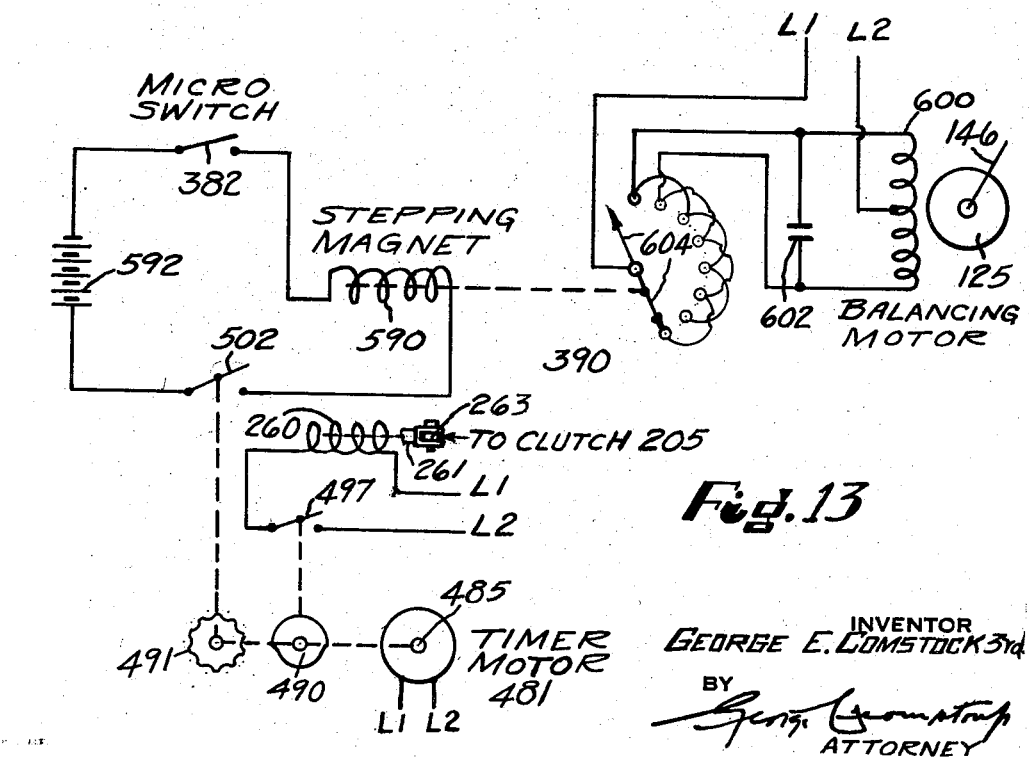

INVENTOR
GEORGE E. COMSTOCK 3rd.
BY
ATTORNEY

April 21, 1959  G. E. COMSTOCK 3D  2,882,745
AUTOMATIC BALANCING MECHANISM FOR ROTATING ELEMENTS
Filed June 9, 1955
9 Sheets-Sheet 9
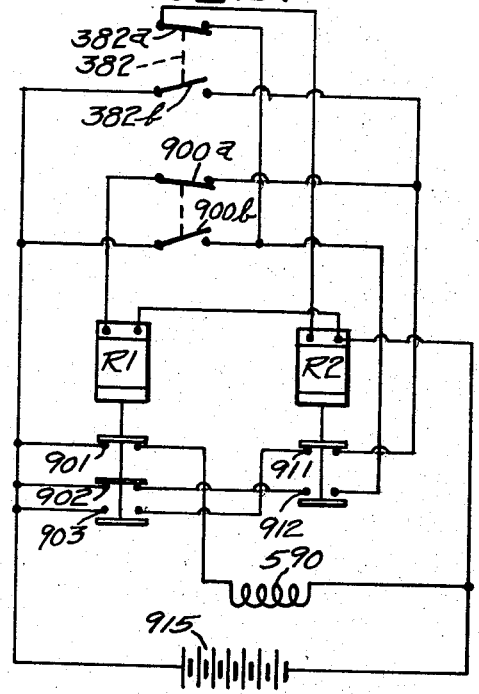
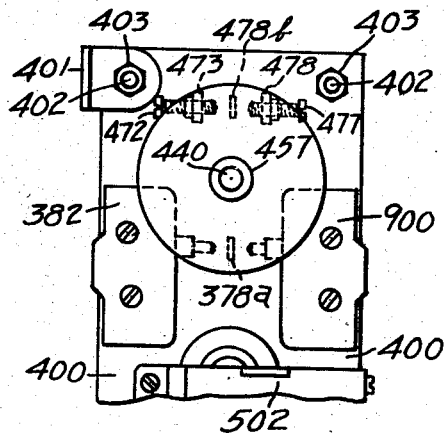
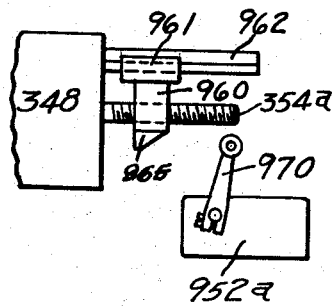
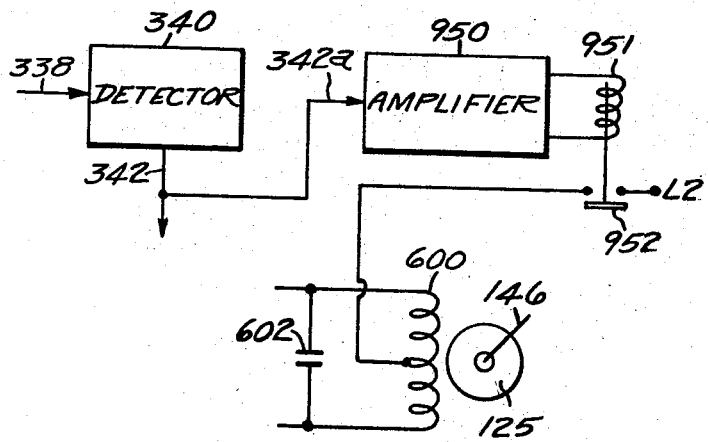
INVENTOR
GEORGE E. COMSTOCK 3rd
BY
ATTORNEY

United States Patent Office 2,882,745
Patented Apr. 21, 1959

2,882,745

AUTOMATIC BALANCING MECHANISM FOR ROTATING ELEMENTS

George E. Comstock 3rd, Holden, Mass., assignor to Norton Company, Worcester, Mass., a corporation of Massachusetts Application June 9, 1955, Serial No. 514,264

52 Claims. (Cl. 74—573)

The invention relates to automatic balancing mechanism for rotating elements and has particular application to the balancing and rebalancing from time to time of a system including a grinding wheel and the machine tool spindle on which it is mounted since grinding wheels as at present made do not stay in dynamic balance as they are worn away or trued away in use.

One object of the invention is to provide a mechanism of the nature indicated which is readily adapted to be incorporated in a precision grinding machine without dislocation of its main operative parts or interference with the normal operation of such machine. Another object of the invention is to provide a balancing mechanism which in a practically continuous manner although actually from time to time rebalances the rotating system thus making such mechanism especially useful for systems where either the addition of matter to the system or the subtraction of matter from it causes loss of dynamic balance. Another object of the invention is to provide mechanical instrumentalities to move masses in rotating system from non-rotating stations. Another object of the invention is to provide mechanical instrumentalities to move masses in a rotating and reciprocating system from non-rotating and non-reciprocating stations. Another object of the invention is to provide electronic actuating apparatus for actuating the mechanical instrumentalities from time to time, such electronic actuating apparatus having great sensitivity. Another object of the invention is to provide accurate foolproof apparatus of the type indicated.

Other objects will be in part obvious or in part pointed out hereinafter.

Figure 7:
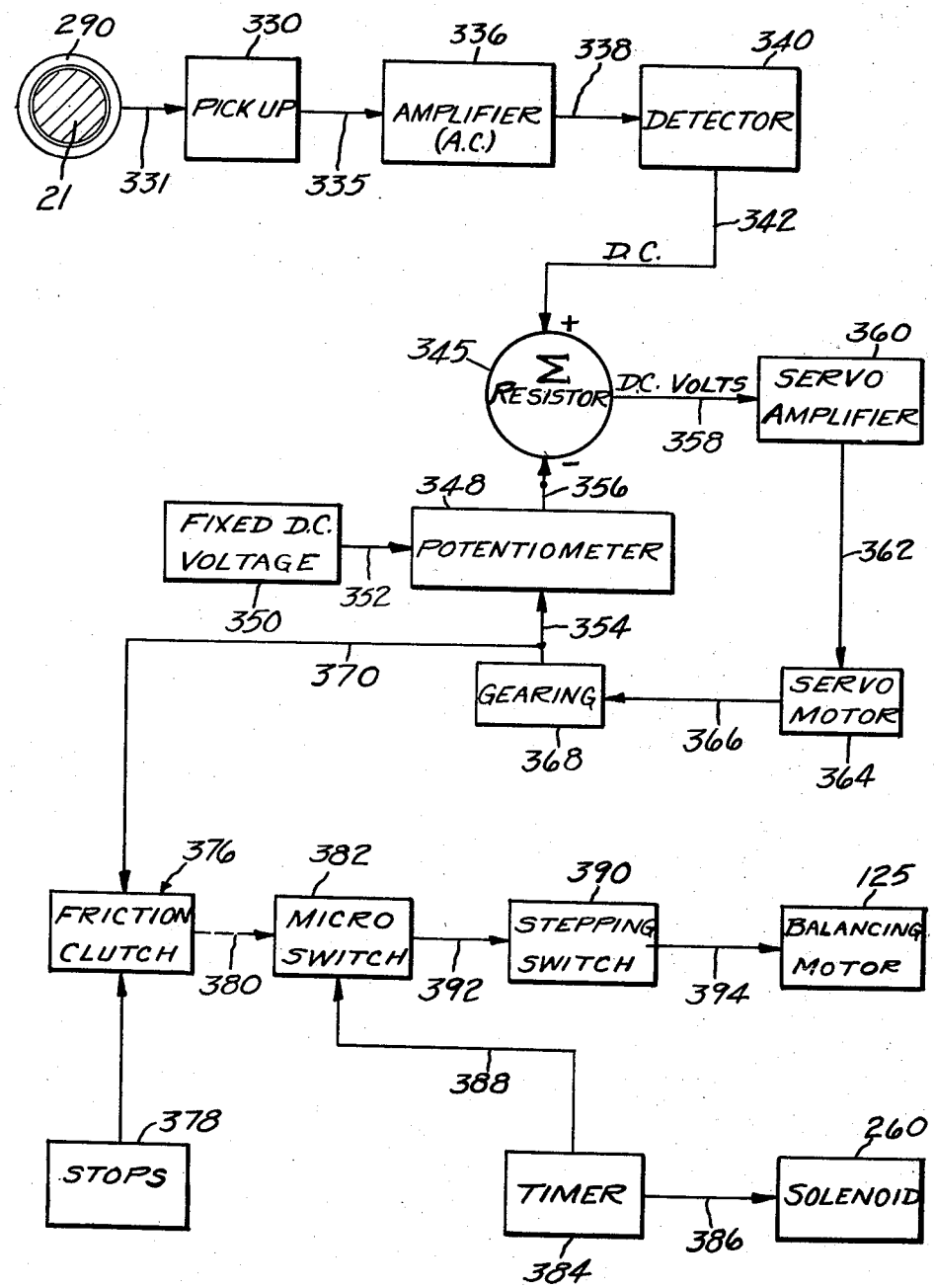
Figure 15:
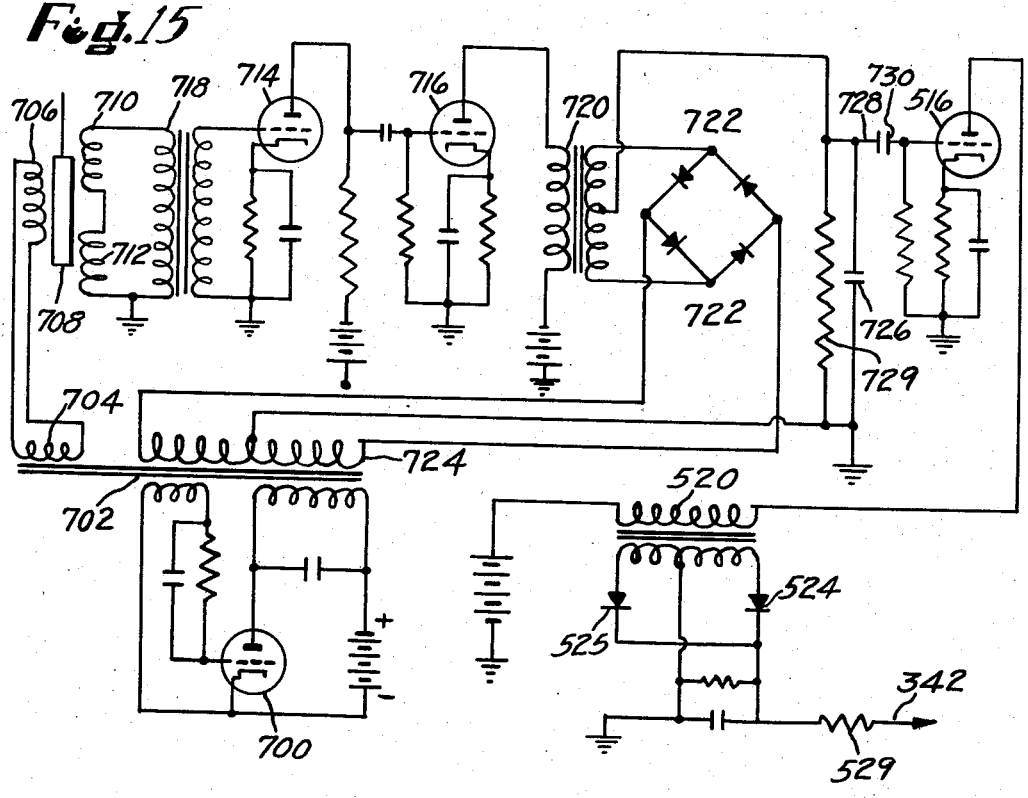
Figure 14:
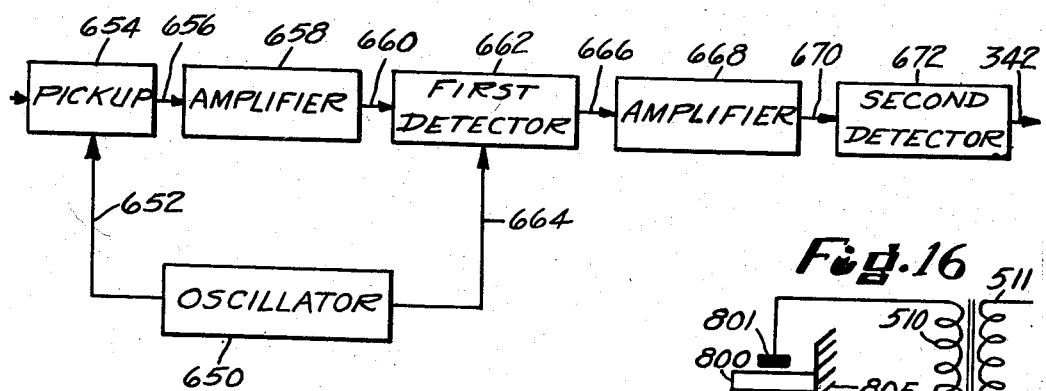
Figure 16:
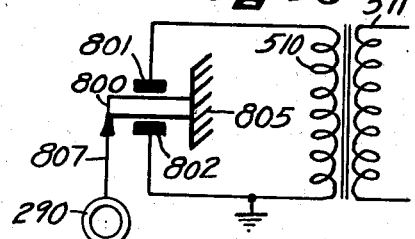

In the accompanying drawings illustrating one of many possible embodiments of the mechanical and electrical features of this invention, Figure 1 is a vertical sectional view of a grinding wheel, the spindle upon which it is mounted, the bearings and wheel head with the cross slide in which the spindle is mounted, portion of the base of the machine and the mechanical instrumentalities for restoring balance, illustrating the application of the invention to a cylindrical grinding machine, Figure 2 is a detail of the spindle reciprocating mechanism being a plan view thereof, Figure 3 is a vertical sectional view of the mechanical instrumentalities for restoring balance of Figure 1 but on a considerably enlarged scale, Figure 4 is an end elevation looking from the left hand side of Figure 1, Figure 5 is a plan view of a housing for the mechanism shown at the left hand side of Figure 1 illustrating a solenoid actuator, Figure 6 is a sectional view taken on the line 6—6 of Figure 1, Figure 7 is a block diagram illustrating the electronic actuating mechanism, Figure 8 is a front elevation of an assembly of the servo motor, potentiometer, gear, friction clutch, microswitch, timer and stops illustrated in Figure 9, Figure 9 is a view partly in cross section taken on the line 9—9 of Figure 8, Figure 10 is an enlargement in vertical section of the pickup device of Figure 1 to pick up the vibrations of the spindle, Figure 11 is an electronic diagram of the pickup, amplifier and detector circuits, Figure 12 is an electronic diagram of the servo amplifier circuits, Figure 13 is a wiring diagram, Figure 14 is a block diagram illustrating another embodiment of some of the electronic actuating mechanism, Figure 15 illustrates the electronic circuits of the mechanism shown in block diagram in Figure 14, Figure 16 is an electronic circuit diagram illustrating a further embodiment of the invention by modification of the diagram of Figure 11 at the left hand end thereof, Figures 17 and 18 illustrate a modification in which Figure 17 is a wiring diagram and Figure 18 is a modification of Figure 8, Figure 19 is a wiring diagram of a modification, Figure 20 illustrates mechanical features for a modification of Figure 19.

Referring now to Figure 1, the base 11 of a cylindrical grinding machine has V-ways 12 and a flat way 13 for the support of complementary V-ways 14 and a flat way 15 of a wheel head cross slide unit 16 supporting a driving motor 17 which by means of a driving pulley 18 and multiple V-belts 19 drives a pulley 20 secured to one end of a rather massive spindle 21 on the other end of which a grinding wheel 22 is supported by means of a driving flange 23 having a hub 24 mounted on the tapered front end 25 of the spindle 21 and keyed thereto by means of a key 26, the wheel 22 being clamped to the flange 23 by means of a ring 27 secured in place by means of bolts 28. The foregoing is typical of precision cylindrical grinders and so needs no further elaboration, it being understood that the invention is not limited to any particular type of mounting for a grinding wheel and, in its broader aspects, is not limited to the balancing of grinding wheels at all but may be used for balancing other rotating systems.

For a long time it has been standard practice to reciprocate the grinding wheel of a cylindrical grinder even when doing straight infeed cutting otherwise known as plunge cutting in order to break up the grinding lines and one of the problems in this invention is to apply and operate a rebalancing mechanism to a system which not only rotates but also reciprocates. The wheel spindle 21 has journal portions 30, 31, which are mounted for rotation and also for reciprocation in bearings 32, 33, and while the bearings 32 and 33 have many parts as illustrated in Figure 1, I will not further describe them as they are old in the art and have been illustrated and described in patents many times before.

Wheel spindle reciprocating mechanism is also old and well known but since it raises a particular problem in embodiment of this invention, I will briefly describe it as illustrated in Figures 1 and 2. A worm 41 is part of a sleeve 42 having a flange 43, and the sleeve 42 is mounted on the spindle 21 and secured in place by means of spanner nuts 44 on a threaded portion 45 of the spindle 21. The worm 41 meshes with a worm wheel 47 which is keyed to a vertical shaft 49 having an offset pin 50 supporting an adjustable eccentric 51 secured to the pin 50 by means of a set screw, not shown. The shaft 50 is journalled in an oil pump casing 55 on the lower end of a slotted casting 56 which is secured to the wheel head unit 16, and the casting 56 also journals the shaft 49. The oil pump is for the purpose of lubricating the bearings 32 and 33 and other parts of the machine but need not be further described herein.

An arm 60 has a collar 61 surrounding the eccentric 51 and at the other end the arm 60 has a fork 62 in which is located a pin 63 secured to a yoke 65 having pins 66 extending into a ring 67 which fits between the flange 43 and a collar 68 mounted on the spindle 21 and secured thereto by means of a screw 69.

The yoke 65 is pivotally connected to the unit 16 by means of a bracket 71 and a pin 72 extending through the bracket 71 and the yoke 65. Screws 73 and 74 with holes in the end are secured respectively to the yoke 65 and to the unit 16 and between them extends a spring 75 which urges the yoke 65 to the right, Figure 2, thus keeping the pin 63 in the fork 62. It will be seen without further description that as the spindle 21 rotates, it reciprocates itself, and the amplitude of reciprocation can be varied by adjusting the eccentric 51 on the pin 50 and in fact the adjustment can be from zero reciprocation to the maximum with the adjustment as shown, the maximum being about ⅜ inch in a typical precision cylindrical grinder.

It will facilitate an understanding of the present invention to describe at this point in a general way how the balancing is achieved. The electronic mechanism, hereinafter described, has a pickup which responds to the vibration of the spindle 21 due to unbalance of the system and the signal from the pickup is amplified and detected to determine whether the balance is getting better or worse, that is to say whether the oscillations are increasing in amplitude which means that the balance is getting worse, or that the oscillations are decreasing in amplitude which means that the balance is getting better. The unbalance is conceived of as existing in two coordinates, and electric driving mechanism is provided to alter the value of the coordinates alternatively. The electric driving system is reversible and if the signal indicates balance getting better it is allowed to continue driving in the same angular direction but if the signal detected is that balance is getting worse, the electric driving mechanism is reversed. From time to time the electric driving system is switched from operating the one coordinate of balance to operating the other coordinate of balance and then switched back again and so on.

Figure 1 shows all of the mechanism illustrated in Figure 3 in the same aspect, namely in vertical section, but it will be much more convenient to follow the description by reference to Figure 3 wherein all the reference characters will be found but they cannot all be applied to Figure 1 because of lack of room. Coming now to the specific embodiment of the invention illustrated and described herein, one of the coordinates mentioned is embodied in the radius adjustment of a balancing ring 100 located in a wide groove 101 in the flange 23 at the right hand side of Figure 3. The other coordinate is embodied in the angular adjustment of the ring 100 relative to the flange 23 which is the same as relative to the wheel 22 and the spindle 21. Conveniently the ring 100 is a symmetrical ring so that whenever it is concentric with the spindle 21 it exerts no correction of the balance but this need not be the case and if accidentally it were itself slightly out of balance it would nevertheless operate to rebalance the system exactly as if it were perfect.

The electric and mechanical instrumentalities of this system continually move the ring radially for a limited time while it is maintained angularly fixed in the system. That is to say, since the spindle 21 is rotating, the ring 100 is also rotating, and for a time it is rotating at the same speed as the spindle 21 wherefor it is angularly stationary with respect to the spindle 21 and during such time is continually moving radially with respect to the spindle 21 but this motion usually does involve reversals of direction. Then for another interval of time the ring 100 is moved angularly with respect to the spindle 21, that is to say it is caused to rotate a little faster than or a little slower than the spindle 21, without at that time changing its radial position, and here again reversals in direction of relative angular movement will be the rule. It may thus be said that the ring 100 is continually hunting to achieve and to maintain good balance, and for a limited time it hunts radially and then, for a limited time, it hunts angularly.

As an illustrative practical embodiment of this system, the ring 100 is caused to hunt radially for fifteen seconds, then it is caused to hunt angularly for fifteen seconds, then it is caused to hunt radially for fifteen seconds, then again angularly for fifteen seconds, and so on while the machine is running. In the illustrative embodiment of the invention there are checks executed at intervals of three seconds, and the electronic mechanism responsive to the signal gives a command at the end of each three second interval. Thus by hunting continually and alternately adjusting the radial and the angular coordinates, the system hunts back and forth over the condition of perfect balance in each coordinate thus keeping the out of balance in a very small area near the center point in the coordinate system.

The balancing ring 100 is solely supported by pins 102 in bores 103 in the ring 100, the pins 102 being secured in place in the ring 100 by means of small pins 104. The pins 102 are supported by ball bearings 105 the inner races of which are in engagement with the periphery of a cam ring 110 which is of constant external diameter but is decidedly eccentric as shown. This shape is not a circle.

The pins 102 extend through long slots 111 in an angular adjustment ring 112 which is integral with and mounted on the end of a sleeve 115 of several diameters. The angular adjustment ring 112 is supported by a ball bearing 116 the outer race of which is secured to the flange 23 in the groove 101. Thus the flange 23 supports the angular adjustment ring 112 which supports the cam ring 110 by means of a ball bearing 120 between the ring 112 and the ring 110 the bearing being secured by a nut 121.

Referring now to the upper part of Figure 3, the electric driving mechanism hereinbefore referred to is, in this illustrative embodiment of the invention, embodied in a reversible motor 125. By connecting mechanism now to be described the motor 125 can be caused to rotate the cam ring 110 while maintaining the angular adjustment ring 112 stationary or can be caused to rotate both of them together, and by "rotating" I of course mean relative to the flange 23 and by "stationary" I mean also relative to the flange 23. It will be most convenient to start now at the motor 125 and to trace the driving mechanism right down to the rings 110 and 112 it being understood as hereinbefore explained that the motor 125 is reversed from time to time in accordance with the electronic commands given.

For an understanding of the supporting structure for the mechanism about to be described, reference may be made to Figure 1 which near the V-ways 12 in the lower left hand part of this figure shows a lug 130 secured to the wheel head-cross slide 16 and which lug 130 is part of and supports an inner fixed wheel guard casing 131. Referring now to Figure 4, the inner wheel guard casing member 131 has, as shown in the left hand side of Figure 4, hinge members 132 which are connected to an interposed hinge member 133 by means of a hinge pin 134, the hinge member 133 being part of a door-like wheel guard member 135 which can be swung open after releasing a bolt 136 which normally secures together the door 135 and the fixed wheel guard member 131.

Referring now to the central upper portion of Figure 4 and the left hand end of Figure 1, a box-like casing 140 has a flange 141 which is secured by means of bolts 142 to the door-like wheel guard member 135. Referring now to Figure 3 for better illustration, the casing 140 has an integral shaped support 145 which supports the motor 125. Coupled to the shaft 146 of the motor 125 by means of a coupling 147 is a shaft 148 journalled in ball bearings 149 supported by the support 145 and on the shaft 148 is secured a worm 150 meshing with a worm wheel 151 on a shaft 152 supported by ball bearings 153 mounted in the support 145. The shaft 152 is also journalled by ball bearings 155 mounted in the front wall of the casing 140.

A block 157 which can be in the shape of a cylinder with projecting cylinders on the sides is pinned to the shaft 152 and it is also pinned to shafts 161 and 162 which extend through and are of enlarged diameter outside of the hub portions of planet bevel gears 167 and 168 and this construction holds together the planet bevel gears 167 and 168 in engagement with sun bevel gears 173 and 174 which are secured for rotation to spur gears 175 and 176. It will now be seen that when the shaft 152 is rotated at slow speed by the reversible motor 125 acting through the worm 150 and the worm wheel 151, the planet gears 167 and 168 are rotated orbitally and they are free to rotate diurnally as compelled by the rotation of the sun gear 173. None of the sun gears 173 and 174 or the spur gears 175 and 176 to which they are coupled are fixed upon the shaft 152 but all of them are free to revolve upon it.

Below the spur gear 175 is a spur gear 180 which is keyed to a shaft 182 which is, when the door 135 is closed, coaxial with the spindle 21 and driven by it in a manner which will be hereinafter pointed out. This spur gear 180 meshes with an idler gear 183 mounted on a shaft, not shown, projecting inwardly from the front of the casing 140, and the idler gear 183 meshes with the spur gear 175. It follows that the spur gear 175 and therefore the sun bevel gear 173 rotates as the spindle 21 rotates and in the same angular direction. Assuming now that the motor shaft 146 is stationary as it will be momentarily at moments of reversal, the shaft 152 will also be stationary, so therefore the planet gears 167 and 168 will not be revolving orbitally. But, assuming the spindle 21 is revolving, the planet gears 167 and 168 will be rotated diurnally which will drive the sun gear 174 in the angular direction opposite to that of the sun gear 173. The sun gear 174 being coupled to the spur gear 176, it drives a spur gear clutch member 190 with which it is always in mesh, and the sizes of the gears above mentioned are such that with the motor 125 stopped, the spur gear clutch member 190 is driven at the same angular velocity and in the same direction as is the shaft 182.

Referring now to the middle part of Figure 3, the spur gear clutch member 190 is pinned by means of a pin 193 to a sleeve 194 which is keyed by means of a key 195 to an inner sleeve 196 which has clutch teeth 197 normally engaging clutch teeth which can't be given a separate number on the end of a leftwardly projecting reduced diameter portion 200 of the cam ring 110. Thus if the motor is not rotating the cam ring 110 is driven at the same rate of revolution and in the same direction as is the spindle 21. The provision of clutch teeth 197 and cooperating clutch teeth instead of having the sleeve 196 integral with the portion 200 is to permit the parts to separate when the door 135 is opened, thus to permit the door to be opened, and as hereinafter pointed out, there are other similar provisions for separation of the parts which, when the door is closed, operate as units.

It will thus be seen that the motor 125 drives the cam ring 110 in either angular direction relative to the rotating system because if the motor 125 is not rotating, the cam ring 110 rotates with the system. Coincidentally, unless the angular adjustment ring 112 is rotated with the system, the angular coordinate will be changed. But I make provision for rotating the angular adjustment ring 112 to keep up with the system, that is to say to rotate it at the same speed as the spindle 21, during relative rotation of the cam ring 110.

Referring now to the left hand side of Figure 3, the spur gear 180 and a clutch ring 205 have cooperating clutch teeth 206, while the clutch ring 205 has on the other side clutch teeth 207 which can mesh with clutch teeth 208 on the gear and clutch member 190 depending upon the position of the ring 205, which has only two positions. In Figure 3 as well as in Figure 1, the clutch teeth 206 are shown in engagement thus coupling the ring 205 to the spur gear 180, which, it will be remembered, is driven by the shaft 182 which is revolving at spindle speed. A key 210 keys the ring 205 to a sleeve 211 which is keyed by means of a key 212 to a sleeve 213 which is connected by a clutch 214 (involving teeth on both parts) to the sleeve 115 of the angular adjustment ring 112. Thus with the clutch ring 205 in the left hand position as shown in Figure 3, the angular adjustment ring 112 is rotating with the system but the cam ring 110 is rotating relative to the system in the angular direction determined by the direction of rotation of the motor shaft 146 and at a low speed due to the reduction gearing. Thus is accomplished the change of the radial coordinate of balance while leaving the angular coordinate fixed.

But when the clutch ring 205 is moved to the right, to disengage the clutch teeth 206 and to engage the clutch teeth 207 and 208, the two rings 110 and 112 will be moved angularly in the system by the motor drive, or if the motor were not running would simply rotate with the system, because the clutch ring 205 is now clutched to the spur gear clutch member 190 and thus the sleeve 211 and the sleeve 213 are driven at the same speed as the sleeve 194 and the sleeve 196; in fact all of these sleeves are rotating together. At this time the assemblage of gears 167, 168, 173, 174 with the input through gear 175 and the output through the gear 176 and the adjustment input through the shaft 152 determines this rotation and it will be seen that the foregoing mechanism is a differential having two inputs and an output. With the cam ring 110 rotating relative to the system for adjustment and the angular adjustment ring 112 rotating with it, the pins 102 are rotated relative to the system about the axis of the spindle 21 but they are not moved radially, and thus the purpose of the invention is achieved.

Referring to Figure 3, it will be seen that the sleeves 194, 196, 211 and 213 support each other but, as a system, they are supported by ball bearings 220 which are supported by the casing 140 and the support 145 thereof. Thus the outer sleeve 194 is directly supported by the ball bearings 220 and the shaft 182 is supported by the inner sleeve 213.

The sleeves 194 and 196 constitute a telescoping system and, as the spindle 21 reciprocates, the sleeve 196 is reciprocated, by direct action through the portion 200 which pushes the sleeve 196 to the left, and by means of a spring 221 thrusting against the sleeve 194 which returns the sleeve 196 to the right. In this connection it will be seen that the outer races of the ball bearings 220 are held in place between a flange 225 of the casing 140 and the support 145 and a ring 226 which is secured to the casing 140 and to the support 145 as shown. The sleeve 194 has a flange 228 which engages the inner race of the right hand ball bearing 220 and the spring 221 keeps them in engagement. Thus it is that the drive to the cam ring 110 is introduced from a stationary source into a reciprocating system.

In like manner the sleeves 211 and 213 are expanded telescopically by a spring 230 which bears against the sleeve 213 and against a flange 231 extending inwardly from the sleeve 211, thus to urge sleeve 213 into engagement with the sleeve 115 of the adjustment ring 112. Thus the drive for the ring 112 is introduced into the reciprocating system.

The spindle 21 has at the left hand end thereof a threaded end 235 upon which is mounted a slotted cap 236 receiving a screw driver end 238 of a plunger 240. The plunger 240 is located in a bore 241 extending axially of the shaft 182. The plunger 240 is slotted with a slot 245 and a pin 246 in the shaft 182 extends across this slot thus connecting together the plunger 240 and the shaft 182 for driving of the latter by the former. Also located in the bore 241 to the left of the plunger 240 is a spring 250. As the spindle 21 and therefore the cap 236 reciprocates, it pushes the plunger 240 against the spring 250 which simply crushes and expands and the shaft 182 does not reciprocate but is rotated by means of the pin 246.

The shaft 182 is journalled in a thrust ball bearing 251 the outer race of which is held in position in the front wall of the casing 140 by means of a cap 255 while the inner race of the ball bearing 251 is held in place between the end of the gear 180 and a spanner nut 257 on the threaded end 258 of the shaft 182. The right hand side of the gear 180 is held by a shoulder 259 on the shaft 182. Thus the non-reciprocating shaft 182 is rotated by means of the reciprocating spindle 21 and one input to the differential comes from the reciprocating system to a non-reciprocating system. Furthermore, without further description, it will be clear that the door 135 can be opened at any time which will of course open the clutches 197, 214 and 238, for the screw driver end 238 and the slot into which it projects is a clutch. The drive is of course disconnected when the door 135 is opened. When the door is closed again the clutches are reengaged and the mechanism becomes operative.

For the shifting of the clutch ring 205 from one position to the other, I provide as shown in Figures 4 and 5, a solenoid 260 which, when energized, attracts a core 261 connected by a pin 262 to an arm 263 which is connected by means of a screw 264 to a yoke 265 which, as shown in Figure 3, has studs 266 in a groove 267 in the clutch ring 205. A spring 270, Figure 5, urges the yoke 265 to the left, Figure 3, when the solenoid 260 is deenergized. As shown in Figure 5 the yoke 265 is connected by a pin 275 to a bracket 276 secured to the inside of the casing 140 thus pivotally mounting the yoke 265 for movement with the arm 263 as a lever under the alternate influence of the spring 270 and the solenoid 260. The spring 270 is secured at the outer end by a pin 277 to the casing 140. Accordingly when the solenoid 260 is energized, the clutch teeth 207 are caused to mesh with the clutch teeth 208, and when the solenoid 260 is deenergized, the cooperating clutch teeth 206 are held in engagement.

Referring now to Figures 1 and 10, the oil pumped by the oil pump 55 is conducted to oil spaces 280 and 281 in the bearings 32 and 33 by conduits not shown as this is well known in the art. In the case of the bearing 32 and oil space 280, the oil is sent back to circulation by means of an oil slinger ring 283 secured by a snap ring 284 in a groove 285 of the spindle 21 and is picked up by an oil collector ring 286 whence by other conduits not shown it is returned to a sump not shown from which the pump 55 draws it.

I provide a pickup ring 290 mounted on the journal portion of the spindle 21 and as seen it is located between the oil space 280 and the slinger ring 283 so therefore oil is running underneath it as it has to have a clearance from the spindle 21 being a stationary ring. This clearance is sufficient to allow a free running fit but not great enough to avoid picking up the vibrations of the spindle 21 and conveniently I have found that a clearance of about half a thousandth on the radius is good. Therefore, the pickup ring 290 which can be made of bronze to provide dissimilar metal contact vibrates as the spindle 21 vibrates and the oil film which keeps the ring 290 and the spindle 21 out of actual metallic contact constitutes an hydraulic medium for the transmission of the vibrations. These vibrations will naturally occur in every vector of plane of rotation of the spindle 21 but there will always be a component in any given vector and illustratively the vibrations in the vertical direction are those that are picked up by the ring 290 and transmitted to the detecting mechanism.

The oil collector ring 286 is secured in any suitable manner to the slide 16, as by means of bolts not shown. It has a vertical bore 295 through which extends a pickup rod 296 that extends also through a vertical bore in a casing 297 secured by bolts 299 to the collector ring 286. The upper end of the pickup rod 296 is threaded and passes through a flat spring 300 secured by means of a screw 301 and a block 302 to a plate 303 secured by screws 304 to the casing 297, the flat spring 300 being also secured by nuts 305 to the rod 296. At the bottom bore 295 is constricted at 310. This construction, which could be varied, allows the rod 296 to move up and down but prevents other movement except a very slight lateral component which, since the movement is a fraction of a thousandth of an inch can practically be disregarded.

The upper end of the pickup rod 296 is connected by a screw connection 311 to a permanent magnet core 312 which is connected by a screw connection 313 to a supporting rod 314 which is threaded at the upper end and has nuts 315 surrounding a flat spring 316 secured by a block 317 and a screw 319 to the plate 303. This provides further support for the system consisting of the pickup rod 296, the supporting rod 314 and the permanent magnet core 312. The rods 296 and 314 are preferably made of non-permeable material so that the magnetic field created by the permanent magnet core 312 extends from end to end thereof and through a pair of windings 320 and 321 located one above the other. The core 312 is a bar magnet with opposite poles at the ends.

By reason of the fact that there are two windings 320 and 321 with a division between them mid-way between the poles of the magnet 312, and by reverse connection of these coils into the system as will be hereinafter pointed out, vibration in a vertical direction of the magnet core 312 induces an electromotive force in the pair of coils 320 and 321. This is amplified and detected and caused to give the commands hereinbefore mentioned in a manner which will now be explained.

The output voltage of windings 320 and 321 is instantaneously proportional to the velocity at that instant of the permanent magnet core 312. When an unbalance exists in the apparatus including the grinding wheel 22, the mounting flange 23 and their associated parts mounted on spindle 21, a centrifugal force directed radially from the center of rotation of the spindle 21 through the center of gravity of the rotating system and proportional in magnitude to its unbalance moment and to the square of rotational speed of the spindle 21 causes the geometric center of the spindle 21 to move eccentrically in a circular locus about the center of rotation of the system at a rotational speed equal to that of the spindle 21. This eccentric motion has a vertical component which is a displacement sinusoidally varying in time, the sinusoidal amplitude being equal to the radial eccentricity of the geometric center of spindle 21 relative to the center of rotation, and having a frequency equal to the rotational speed of spindle 21. Thus pickup ring 290 imparts to pickup rod 296 a sinusoidal movement of the above character, this movement being in turn transmitted to the permanent magnet core 312.

Thus the output voltage from windings 320 and 321 which are connected back to back to secure an addition of the EMF's generated by the north and south poles respectively of permanent magnet core 312 is a sinusoidal voltage wave form whose amplitude is proportional to the product of the displacement amplitude times the circular frequency of the oscillation of the magnet core 312, and having a frequency equal to said frequency.

Referring now to Figure 7, in the upper left hand corner I show in section the spindle 21 and coaxial therewith pickup ring 290. The pickup 330 of Figure 7, comprising the coils 320 and 321 and the permanent magnet core 312 of Figure 10, is shown connected to pickup ring 290 by line 331 which represents the pickup rod 296 and associated components of Figure 10 serving to actuate permanent magnet core 312. The output of pickup 330 is, as described above, a sinusoidally varying voltage, that is to say an alternating current voltage, which is connected by line 335 to an A.C. amplifier 336 of Figure 7 whereby the relatively small output voltage from the pickup may be of the order of 100 microvolts R.M.S., whereas a corresponding voltage level of the order of 50 volts R.M.S. may be desirable for actuating the remainder of the control circuit. The alternating current output voltage of amplifier 336 is connected by a line 338 to detector 340 where it is rectified and filtered to provide a smooth direct current output from detector 340 which is connected by line 342 to a summing resistor 345.

Directly below resistor 345 in Figure 7 is potentiometer 348 which is excited with a fixed direct current voltage derived from voltage source 350 shown connected to potentiometer 348 by line 352 of Figure 7. The output voltage of potentiometer 348 is a fraction of the fixed input voltage supplied by voltage source 350 proportional to the angular setting of the mechanical input to potentiometer 348 which is physically a shaft and is represented in Figure 7 by a line 354. This output voltage from potentiometer 348 is connected by line 356 to the summing resistor 345 and is of polarity opposite to that of the detector output voltage. The resistance of summing resistor 345 is so chosen in relation to the output impedance value of detector 340 and potentiometer 348, that nearly linear summing action is secured, its resistance being several times lower than said output impedances. Thus the net D.C. voltage appearing across resistor 345, this voltage constituting its output, is proportional to the difference between the input voltages on lines 342 and 356, its polarity being the same as the polarity of the larger of the two input signals. This D.C. output voltage is connected by a line 358 to a servo amplifier 360 whose output on line 362 drives servo motor 364. The output of servo motor 364 is a shaft rotation which is connected by line 366 through gearing 368 to the input shaft of potentiometer 348 as shown by line 354 of Figure 7. The direction of rotation of servo motor 364 in response to an input signal on line 358 to the servo amplifier 360 is such that the potentiometer 348 is driven in a direction which will minimize the input voltage on line 358, that is to say the potentiometer 348 is driven in such a direction that the voltage appearing on line 356 is made equal and opposite to the voltage appearing on line 342.

Thus if the voltage on line 342 is changing, the servo motor 364 drives potentiometer 348 so that its output voltage on line 356 is changing at the same rate as the output voltage of detector 340. If the output voltage of detector 340 is increasing in magnitude then the direction of rotation of potentiometer 348 is such that its output voltage is increasing in magnitude.

Therefore since the output voltage of detector 340 is proportional to the output voltage of pickup 330, which in turn is proportional to the amplitude of the eccentric motion of spindle 21, and since this is proportional to the degree of unbalance of the rotating system mounted on spindle 21, the angular position of the shaft of potentiometer 348 is maintained at all times proportional to the degree of unbalance of the rotating system.

Line (shaft) 354 which represents the mechanical drive from gearing 368 to the shaft of potentiometer 348 is also connected by a line (shaft) 370 to a friction clutch 376 to be described more fully in connection with Figures 8 and 9. While the input member of friction clutch 376 is free to rotate continuously as dictated by input 370, its output member is constrained by stops 378 to a small angular displacement for example 10° of arc; thus if the mechanical input 370 turns continuously counter-clockwise the output member of friction clutch 376 will be stalled against the counter-clockwise stop, whereas for continuous clockwise rotation of mechanical input of 370 the output member of friction clutch 376 is stalled against the clockwise stop. I provide a suitable mechanical actuating means indicated in Figure 7 by line 380 for operating a micro switch 382 in response to the angular position of the output member of friction clutch 376 in such a manner that the micro switch is closed when the output member of the friction clutch approaches and reaches one of the stops and is otherwise opened. I provide a timer 384 which at regular intervals energizes and deenergizes solenoid 260 previously described in connection with Figures 4 and 5, the interconnection between timer 384 and solenoid 260 being along line 386 of Figure 7. A typical operating sequence of solenoid 260 under the command of timer 384 is: energized for 15 seconds deenergized for the subsequent 15 second period, energized for the next 15 seconds and so on.

Timer 384 also controls the electrical input to micro switch 382 the interconnection being along line 388. Micro switch 382 energizes the stepping magnet of a stepping switch 390 through the interconnection 392 when and only when two conditions occur simultaneously, namely, when micro switch 382 is in its closed position and timer 384 is supplying an electrical input to micro switch 382. Timer 384 periodically supplies and removes excitation along line 388 at a rate which is of the order of from three to five times as fast as the cycling rate supplied on line 386 to solenoid 260. Thus for example with a 15 second "on," 15 second "off" cycle of solenoid 260, electrical energy may be supplied to micro switch 382 on a 3 second "on," 3 second "off" cycle.

Stepping switch 390 is connected by line 394 to the balancing motor 125 (see also Figure 3) its internal wiring being such that the balancing motor 125 runs continuously but in opposite directions for successive positions of the stepping switch 390. That is to say if the balancing motor 125 is rotating clockwise and simultaneously closure of micro switch 382 and energization along line 388 occurs, the stepping switch is advanced one step and the balancing motor 125 reverses, turning counter-clockwise thereafter until a further actuation of stepping switch 390 again reverses the direction of rotation of the balancing motor. Many stepping switches are advanced by spring action when the electromagnet is deenergized but the principle is the same and either type can be used.

As described above the position of shaft 354 is proportional angularly to the unbalance of the rotating mechanism mounted on spindle 21. If the unbalance is being reduced by balancing motor 125 turning in the appropriate direction whereby to reduce the unbalance, shaft 370 rotates continuously in one direction and thus the output member of friction clutch 376 is stalled continuously on one of its stops. The mounting of the micro switch is such that under these conditions the micro switch 382 is opened. Therefore, the electrical signals from timer 384 along line 388 do not reach stepping switch 390 which therefore does not step, thus permitting balancing motor 125 to continue rotation in the direction which reduces the degree of unbalance.

However, should balancing motor 125 be turning in such a direction that the degree of unbalance is increasing, then friction clutch 376 is turning in the opposite direction, its output member is stalled against the opposite stop, and micro switch 382 is closed. Under these conditions the receipt of a timing signal on line 388 causes stepping switch 390 to step, thus reversing the direction of rotation of balancing motor 125, which causes the degree of unbalance to begin to diminish, friction clutch 376 reverses in direction of rotation, micro switch 382 opens and stepping switch 390 is unaffected by the next timing signal on line 388. The frequency of repetition of timing signals on line 388 is determined by the rapidity with which the micro switch 382 opens upon reversal of balancing motor 125; for example if the micro switch 382 opens 1½ seconds after reversal of motor 125, the timing period could be as short as slightly more than 1½ seconds, therefore selection of a period of 3 seconds allows ample margin of safety.

As a result of the action described above, balancing motor 125 drives the system to the point of best balance with respect to the coordinate along which adjustment is being effected. As solenoid 260 is periodically energized and deenergized the balancing motor action is transferred from one coordinate of balancing to the other, and since the period of energization of solenoid 260 to several times longer than the interval between timing signals supplied to micro switch 382, the balancing motor is enabled to establish an optimum balance or an approach to optimum balance on first one coordinate of balancing and then the other. Thus the system continuously searches about the point of best balance compensating for small changes in the position of the center of gravity of the rotating members mounted on spindle 21 as they occur.

Referring now to Figures 8 and 9, secured to any convenient part of the grinder such as to the electrical control panel, not shown, which contains the electrical mechanism hereinbefore described, is a plate 400 having brackets 401 for mounting as aforesaid and connected by a stud 402 with nuts 403 to a second plate 404 thus constituting a framework for the mounting of two separate mechanisms of those which have been previously described in diagram. Secured by means of clamp 410 and screws 411 to the plate 404 is the servomotor 364 which has a shaft 412 coupled by coupling 413 to a pinion gear 415 which drives a spur gear 416 coupled by its hub 417 to a pinion gear 419 which meshes with a spur gear 420 coupled by its hub 421 to a pinion gear 423 which meshes with a spur gear 424. The pinion gear 419 is mounted on a shaft 426 which extends through the hub 417 and the shaft 426 is journalled in ball bearings 427 mounted in the plate 400. Similarly pinion gear 423 is mounted on a shaft 430 extending through the hub 421 and the shaft 430 is journalled on ball bearings 431. It will thus be seen that the servomotor 364 drives the spur gear 424 at a much reduced rate of revolution, illustratively at about ½₀₀ of the r.p.m. of the motor 364.

The gear 424 is coupled to the potentiometer 348 and also to the friction clutch 376. Constructionally a shaft 440 extends through the hub 441 of the gear 424 and the hub 441 is fastened to the shaft 440 as by a set screw. The right hand end of the hub 441 is bored to receive the shaft (line) 354 of the potentiometer 348. This shaft 354 extends through a hub 447 of the casing of the potentiometer 348 and the hub 447 extends into a hole in the plate 404 while a nut 450 screwed onto the end of the hub 447 holds the potentiometer in place thus mounting it on the plate 404.

The shaft 440 extends leftwardly through a ball bearing 451 mounted in the plate 400 and extends through a friction disc 455 and into a second friction disc 456 having a hub 457 to which the shaft 440 is connected by a set screw. A spring 460 extending between the disc 455 and a washer 461 which is backed up by the ball bearing 451, urges the disc 455 to the left. Friction pads 463 of some soft material such as cork are preferably provided between the discs 455 and 456, as friction between metal and cork is more uniform than between metal and metal. The disc 456 is the input member of the friction clutch 376 while the disc 455 is the output member thereof.

Secured to the output disc 455 are a pair of stops 378a and 378b which conveniently are 180° apart on the disc. The stop 378a is located between a stationary screw 472 extending through a boss 473 projecting from the plate 400 and the operating rod 475 of the micro switch 382. Thus reversals of the servomotor 364 move the stop 378a back and forth between the screw 472 and the rod 475. Owing to the short distance between the screw 472 and the rod 475, reversal in the direction to carry the stop 378a against the rod 475 does not precede by a great deal the actuation of the rod 475. The stop 378b is positioned close to a screw 477 which extends through a boss 478 projecting from the plate 400 and serves merely to relieve the rod 475 of excessive load by limiting the travel of the stop 378a, since the micro switch 382 is a delicate mechanism.

Secured to the plate 400 is a gear box 480 connected to the timer motor 481 which with the other mechanism is identified in Figure 7 as the timer 384. The gearing in box 480 illustratively reduces the speed of the motor to about 2 r.p.m. The output shaft from the gear box 480 is indicated by the numeral 485 and, extending through a hole in the plate 400, extends further through cams 490 and 491, the latter being secured to the former and the cam 490 having a hub 492 and being secured to shaft 485 by means of a set screw. The cam 490 has one lobe extending 180° circumferentially as indicated in Figure 8. It operates a roller 495 on the end of a rod 496 which is part of a micro switch 497 and this micro switch 497 actuates the solenoid 260.

The cam 491 has 10 lobes, and actuates a roller 500 on the end of a rod 501 which is part of a micro switch 502 which provides electrical energy for the micro switch 382. The micro switches 502 and 382 are connected in series so that the magnet of stepping switch 390 is energized only if both are closed. The circuit, of course, includes a source of power connecting these two switches in series with the stepping magnet.

The electronic circuits of the apparatus of Figure 7 are illustrated in Figures 11, 12 and 13. Referring now to Figure 11, the pickup 330 comprises the permanently magnetized core piece 312 and windings 320 and 321, the latter being connected in series aiding as hereinbefore described, and connected to the primary winding 510 of a coupling transformer the secondary 511 of which supplies an input signal to the input stage 512 of a resistance capacitance coupled amplifier. This input stage 512 is connected to the second stage 514 which in turn is connected to the output stage 516 of the amplifier. Since Figure 11 shows elements of the stages in conventional electrical diagram I shall not describe separately the several plates, grids, cathodes, resistances, capacitances and connecting conductors which can be plainly seen in Figure 11. The output stage 516 of the amplifier is connected to the detector 340 by way of a primary winding 520 of a transformer having a secondary 522 the ends of which are connected to rectifiers 524 and 525, the secondary 522 having a center tap 526 which is grounded and the rectifiers 524 and 525 being cross connected by a load resistor 527 and smoothing capacitor 528 to give positive output 342 heretofore mentioned through a decoupling resistor 529.

Referring now to Figure 12 the direct current signal output voltage of the pickup-amplifier-detector circuit of Figure 11 is brought in on line 342 in the upper left hand corner, and is connected to ground through the summing resistor 345. A negative voltage relative to ground is taken from potentiometer 348 through a second decoupling resistor 530 to the summing resistor 345. The net voltage appearing across the summing resistor 345 is applied as an input signal by conductor 358 to a differential amplifier comprising tubes 532 and 533. The differential amplifier has a cathode resistor 539 which preferably is of high resistance in order to minimize common mode sensitivity and to maximize differential linearity. The output of the differential amplifier 532—533 is connected by lines 540 and 541 which are cross connected through plate load resistors 542 and 543 to the grids of triode tubes 550 and 551 which grids are also connected to the ends of a center tap resistor 555 the center tap 556 of which is connected to the movable element 557 of a potentiometer 558 which connects the indirectly heated cathodes of the tubes 550 and 551. A battery 559 supplies plate current to the differential amplifier. The balance of the plate circuit of tube 550 comprises conductor 560, one-half of a primary winding 562 of an output transformer whose secondary winding 564 comprises the output circuit of the servo amplifier 360 and the secondary winding 566 of a power supply transformer whose primary 570 is excited from alternating current mains L1 and L2, in series connection.

The balance of the plate circuit of tube 551 comprises conductor 580, the other half of the primary winding 562, and the secondary winding 566, in series connection. The secondary winding 564 is connected to one stator winding 582 of the two phase servomotor 364. The other stator winding 584 of the servomotor 364 is energized through a series phase shifting capacitor 585 from the alternating current mains L1—L2. Shunting primary winding 562 is a capacitor 586. The rotor 588 of servomotor 364 is shown in Figure 12 as connected by line 366 to gearing 368 corresponding to the diagrammatic representation of Figure 7.

Referring now to Figure 13, at the bottom center, the output shaft 485 of the timer drives cams 490 and 491 as hereinbefore described in connection with Figure 9. The cam 490 is diagrammatically shown actuating microswitch 497, and cam 491 is diagrammatically shown actuating microswitch 502. Microswitch 497 is shown in Figure 13 in series connection with solenoid 260 across the alternating current mains L1—L2. Microswitch 502 is shown in Figure 13 in series connection with microswitch 382, stepping magnet 590 of stepping switch 390 and a direct current source identified as a battery 592. On the right hand side of Figure 13 balancing motor 125 can be a split phase capacitor type reversible three lead alternating current motor having stator winding 600 and phase shifting capacitor 602 connected as shown to lines L1 and L2 and to the contacts of the stepping switch 390 wired such that in successive positions of the wiper arm 604 of stepping switch 390 opposite sides of the stator winding 600 are alternately connected to L1, thereby effecting reversal of the direction of rotation of the balancing motor 125.

Whereas the above discussion has been based on a pickup 330 of a self-generating velocity sensitive type this embodiment of the pickup is not to be construed as limiting the scope of this invention, for pickup instrumentalities based on other principles of operation may be employed.

For example as illustrated in Figure 16, I can employ a self-generating strain sensitive pickup, in this case a piezoelectric crystal 800 which is clamped at its right hand end to a stationary support 805 and has electrodes 801 and 802 and which is driven by the movement of the ring 290 as diagrammatically shown by line 807 connected to its left hand end. Electrodes 801 and 802 are connected to the primary winding 510 of the input transformer of the first amplifier stage 512 as in Figure 11, the balance of the circuit being as described previously for the velocity sensitive pickup.

Other transducers which operate effectively as pickup means include self-inductive and capacitive types. An important class of pickups which are useful in this invention are those which embody strain or position sensitive, self-inductive, mutually inductive, capacitive, or resistive four terminal networks which are characterized as suppressed carrier modulators.

As an illustrative example of the use of a pickup device from the class of pickup devices which may be described as position sensitive bidirectional alternating current suppressed carrier modulators, I show a suitable control system in block diagram form in Figure 14. An oscillator 650 supplies excitation energy along line 652 to the position sensitive pickup 654 which it is to be understood is mechanically coupled to the pickup ring 290 and therefore develops an output signal on line 656 which is an amplitude modulated sinusoid whose modulation carries the position information relative to ring 290. The output signal from the pickup 654 is connected by line 656 to a carrier amplifier 658 which in turn is connected by a line 660 to a first detector 662 which receives a phase reference input signal from oscillator 650 along line 664. The first detector 662 may be any suitable embodiment from the class of detectors known to the art as phase sensitive detectors or phase sensitive demodulators. Thus the first detector output voltage appearing on line 666 is proportional to the instantaneous position of ring 290, and hence is itself a sinusoidally varying voltage whose frequency is equal to the rotational speed of spindle 21 and whose amplitude is proportional to the eccentric motion of ring 290, and is in consequence proportional to the degree of unbalance in the rotating system mounted on spindle 21. The output signal on line 666 is further amplified as required by amplifier 668 the output of which is connected by line 670 to a second detector 672 the function of which is to develop a direct current output voltage proportional to the amplitude of the signal output voltage from the first detector. Consequently the output voltage of the second detector is exactly analogous to the output voltage of the detector 340 of Figures 7 and 11 and may in fact be supplied to the balance of the control system of Figure 7, i.e. through summing resistor 345, in precisely the same manner as the output voltage from detector 340 was.

Figure 15 illustrates an instrument system based upon the discussion presented above in connection with Figure 14. A tube 700 is connected in a tuned plate oscillator circuit having a plate transformer 702. Secondary winding 704 of the plate transformer 702 supplies alternating current excitation to the primary winding 706 of a linear variable differential transformer whose core piece 708 may be treated mechanically in the same manner as the permanent magnet core piece 312 mutatis mutandis of Figures 7, 10 and 11. Secondary windings 710 and 712 connected in series bucking provide a position input signal to a conventional resistance-capacitance coupled amplifier comprising tubes 714 and 716 and associated components through input transformer 718. The output of the amplifier is coupled through output transformer 720 to a diode ring type phase sensitive detector 722 having output load resistor 729 and filter capacitor 726. A phase reference carrier voltage is supplied to the phase sensitive detector 722 from secondary winding 724 of the oscillator transformer 702. The output of the phase sensitive detector appears on a conductor 728 connecting one end of load resistor 729 and filter capacitor 726, said output signal being coupled through capacitor 730 into an amplifier detector circuit which may be identical to the output amplifier 516 and detector 340 of Figure 11, and in Figure 15 tube 516 is shown connecting capacitor 730, output transformer 520 is shown coupling tube 516 to diodes 524 and 525, etc. while the output voltage from the detector is taken through decoupling resistor 529 and appears on line 342.

In further description of the function of the timer, and in particular of cam 491 and switch 502, it is desirable to limit the times at which stepping magnet 590 can be energized, even though switch 382 may be closed, in order to reduce the effect of noise upon the control action. Since the pickup and amplifying systems are extremely sensitive, even to very small disturbances, they might respond to spurious signals causing false actuation of switch 382. If every small disturbance were permitted to affect the direction of rotation of the balancing motor 125 it might hunt ambiguously this way and that without producing effective control action. However, the timer switch 502 samples or tests the condition of microswitch 382 only at intervals, and it is only at the moments of actuation of switch 502 that the stepping magnet can be energized. Therefore the effect of noise disturbances is minimized and the stepping magnet is energized only as a result of a definite trend toward increasing unbalance. Similarly, after reversal of the balancing motor 125 a period of time elapses during which the balancing motor can take up the unavoidable backlash of the mechanical system and can begin to improve the balance (thereby releasing microswitch 382) before another sampling check is made.

Figures 17 and 18 illustrate another way of achieving this same result by replacing the temporal dead band introduced by the timer with a spatial dead band introduced by travel of the friction clutch output member. In this embodiment a second microswitch 900 is mounted on plate 400 opposite microswitch 382 and is actuated by the clutch member 378a when balance is improving. For this circuit each microswitch has two electrically independent sets of contacts, 382a and 382b, and 900a and 900b, normally closed and normally open respectively.

A relay R1 operates a normally closed switch 901, a normally closed switch 902 and a normally open switch 903. A relay R2 operates a normally closed switch 911 and a normally open switch 912. These switches together with the relays R1 and R2 and the microswitches 382 and 900 are interconnected with each other and with a battery 915 and with the stepping magnet 590 of stepping switch 390 in the manner fully illustrated in Figure 17 and it is believed to be superfluous to number all the conductors since the wiring diagram is clear.

This circuit is arranged so that actuation of switch 382 by movement of the friction clutch output member in the direction corresponding to unbalance increasing energizes relay R1 causing stepping magnet 590 to advance the wiper arms 604 of stepping switch 390 (referring to Figure 13) one step, thereby reversing the balance driving motor 125. Furthermore the circuit is arranged so that subsequent operations of microswitch 382 will not cause additional incremental movement of stepping switch 390 until microswitch 900 has been actuated. Similarly repeated actuations of microswitch 900, corresponding to unbalance decreasing, causes no further effect than the first actuation of microswitch 900, which effect is to reset the circuit so that upon the next subsequent actuation of microswitch 382 relay R1 is again energized and the stepping switch steps. In this way by setting the mechanical dead zone between actuation of switches 382 and 900, I eliminate response of the circuit to disturbing noise signals, and render it sensitive only to a trend in the balance increasing or decreasing signal as brought out by the intended operation of the balancing motor 125.

It is believed to be quite practical to balance the rotating system by continually rebalancing it in the direction of better balance in accordance with this invention even though this necessarily entails, in one embodiment of the invention using the timer with the output 388 to the microswitch 382, occasions when the mechanism is actually making the balance a little worse. It will be noticed, however, that in the other embodiment described in connection with Figures 17 and 18, this condition does not occur excepting that, when the balance is perfect, the system must hunt closely if the balancing motor 125 is always energized as was contemplated. However, as a further improvement which may be used for some systems where the most accurate results are desired, reference should now be made to Figure 19 in which detector 340 of Figure 7 is shown in the left hand upper corner. Besides the output 342 of detector 340 I show an output 342a into an amplifier 950 (which need not be described in detail as a usable amplifier has already been described herein). The output of this amplifier 950 is connected to operate a relay coil 951 which operates a normally open switch 952. When the signal is strong, indicating significant unbalance, the switch 952 is closed. The motor 125 and the pertinent part of the circuit for operating it shown in the upper right hand part of Figure 13 is illustrated in Figure 19 and it will be seen that when, responsive to perfect balance or nearly perfect balance, the output from the amplifier 950 is zero or extremely small, the switch 952 will be opened and for the time being the motor 125 will not operate.

Another way of achieving the same result is to operate a switch from the shaft 354 at the end of the travel thereof representing a very small signal from the detector 340, this switch operating to deenergize the motor 125 when it is opened, the switch actuation being arranged so that the switch will be opened when the shaft has revolved to the aforesaid limit of travel. Referring to Figure 20, the potentiometer shaft 354 has an extension 354a which extends to the right and is threaded and passes through a nut 960 on a slide 961 travelling on a slideway 962. A cam 965 formed on the nut 960 will, when the shaft 354 has revolved to the limit representing a very small signal from the detector 340, operate an arm 970 of a normally closed microswitch 952a. This normally closed switch 952a is substituted for the normally open microswitch 952 of Figure 19 in the circuit shown in Figure 19.

It will be seen that the invention as embodied comprises a rotatable and reciprocable system. In this system there is a movable mass which as previously explained is movable in two coordinates to change the balance of the system. These coordinates are so related that any unbalance can be corrected by movement of the mass in the proper direction in each coordinate. The motor 125 and the differential shown in Figure 3 and related parts are stationary with respect to the system while the system is rotating and reciprocating and collectively they move the mass in either direction desired in first one coordinate and then in the other coordinate alternatively.

It will be seen that the differential has one input driven by the rotatable system, it has an output connected to rotate the mass with the system, and it has a second input connectable to move the mass radially and alternatively to move the mass angularly relative to the system. The input driven by the rotatable system is embodied in the gears 180 and 183 driving the gear 175, the output is embodied in the gear 176 driving the gear 190, and the second input is embodied in the motor 125 and connections to the shaft 152.

The telescoping sleeves around the shaft 182 have been described and constitute telescopic connections between the stationary driving and controlling apparatus and the system. These sleeves are part of separate driving means to move the mass in two coordinates. The sleeve 194 drives the mass in the radial coordinate and the sleeve 211 is part of the means to drive the mass in the angular coordinate when it is locked to the sleeve 194 by the clutch 205.

The stepping switch 390 is a controller for the driving means to reverse it when the balance is increasing and this in turn is controlled by the timer 384 which makes the controller responsive to the means connected to the pickup 330 only at intervals. Microswitch 382 is the means connected to the pickup 330 the connection being shown in the block diagram of Figure 7. This connection includes the friction clutch 376 and the actuating means therefor shown in Figure 9.

There is electric means to measure the signal produced by the detector 340 and this electric means is the summing resistor 345 plus the servo loop consisting of the servo amplifier 360, the servo motor 364, gearing 368 and the potentiometer 348. The friction clutch 376 is a mechanically movable element and operates the microswitch 382.

The ring 290 is a pickup member and it has a cylindrical surface mating with the cylindrical surface of the spindle 21 in close but slipping engagement with it.

Everything in Figure 7 beyond the pickup ring 290 to the potentiometer 348 including the servo loop above mentioned is a means to measure the amplitude of vibration of the pickup member as the rotatable element rotates. All the rest of the apparatus of the block diagram of Figure 7, that is to say the line 370 and everything below it in Figure 7 which is responsive to the input of line 370, is means responsive to the means to measure the amplitude of vibration to cause the means which is connected to move the mass to move it in the direction to diminish the unbalance.

In another sense everything from line 335 to line 370 is a vibration measuring means connected to the pickup 330 and friction clutch 376 with microswitch 382 constitutes means connected to the measuring means registering whether the amplitude is increasing or decreasing. This operates stepping switch 390 which is means for reversing the motor when the amplitude is increasing.

The microswitch 502 operated by cam 491 is an intermittently operated device to reverse the motor only at predetermined intervals.

The angular adjustment ring 112 is a rotatable device in the system governing the angular position of the mass which is embodied in the ring 100. It will be remembered that in the left hand position of the clutch 205 the sleeve 211 and therefore the ring 112 is locked to the spindle 21 which is the basic element of the rotatable system. This means that the balancing ring must rotate with the system neither slower nor faster than the system and so whenever the cam ring 110 is driven, the mass embodied in the balancing ring 100 will be moved radially and only radially relative to the system. It will be remembered that the differential has such gear ratios that, with the motor 125 deenergized, the cam ring 110 also and at all times revolves at the same speed as the system. This sets the stage for the input from the motor 125, which is always running when the system is operating properly except at moments of reversal, to rotate the cam ring 110 relative to the system. With the ring 112 rotating with the system the resultant rotation of the cam ring 110 relative to the system produces only a radial displacement of the balancing ring 100. However in the right hand position of the clutch 205, the sleeves 194 and 211 are locked together and therefore there is no relative movement between the cam ring 110 and the pins 102 so therefore the input to the differential through the shaft 152 moves the balancing ring 100 only angularly in the system. The timer motor 481, the cam 490 and the microswitch 497 operated thereby constitute automatic means to shift the clutch 205 back and forth from a first position to a second position and back into the first position and so on at intervals. The purpose of this has been fully explained.

The shaft 21, hub 24, grinding wheel 22, and associated components comprise a system while sheave 20, belts 19, sheave 18 and electric motor 17 are means to introduce kinetic energy into the system. The pickup 330, amplifier 336 and detector 340 are responsive to mechanical vibration of the system. The potentiometer 348 is a mechanically variable element having a parameter of the same kind as the means responsive to mechanical vibration. These parameters are voltages. Summing resistor 345 compares the output voltages of the detector 340 and of the potentiometer 348 and its output is responsive to the algebraic difference between these output voltages. Servo amplifier 360 with servo motor 364 and gearing 368 is an actuating means responsive to the output voltage of the summing resistor, and adjusts the potentiometer 348 which is a variable element to a condition of equality with the output of the detector.

A linear variable differential transformer as illustrated in Figure 15 by primary winding 706, secondary windings 710 and 712 and core piece 708 is a position sensitive transducer which is externally excited and is a bi-directional alternating current suppressed carrier mechanical electrical modulator. Again in Figure 15, vacuum tube 700, anode transformer 702 and associated components is a source of excitation current. The diode ring 722 supplied by output transformer 720 and reference voltage winding 724 and having an output load resistor 729 is a phase sensitive detector.

Whereas the linear variable differential transformer of Figure 15, 706, 708, 710 and 712, is a position sensitive transducer, the velocity sensitive pickup of Figure 11, 312, 320 and 321, is a velocity sensitive transducer. The position of the summing resistor 345 in the circuit is fully illustrated in Figure 12. A summing resistor is a resistor having a plurality of inputs and an output delivering potential which is the algebraic sum of the inputs.

The line 370, the friction clutch 376 and one or more stops 378 and the microswitch 382 constitute means to indicate whether the amplitude of vibration is increasing or decreasing. Such means in the embodiments of the invention described are responsive to means responsive to the mechanical vibration in the system. The fixed voltage source 350 and the potentiometer 348 constitute a variable voltage source and this is subtractively connected to the detector output. The shaft 354 is a movable element of the potentiometer 348. The potentiometer 348 with its shaft 354 and the servo loop already extensively described is mechanical means for registering a variable parameter.

The microswitch 382 is a two stage signalling element which is connected by the friction clutch 376 to the potentiometer shaft 354. When the clutch slips in the direction of increasing variable parameter the microswitch is caused to assume one state and when the clutch slips in the other direction the microswitch is caused to assume the other stage. These states are, of course, on and off position of the switch.

It will thus be seen that there has been provided by this invention an automatic balancing mechanism for rotating elements in which the various objects hereinabove set forth together with many thoroughly practical advantages are achieved. As many possible embodiments might be made of the above invention and as many changes might be made in the embodiments above set forth, it is to be understood that all matter hereinbefore set forth or shown in the accompanying drawings is to be interpreted as illustrative and not in a limiting sense.

I claim:

1. A balancing mechanism for rotating elements comprising a rotatable and reciprocable system, movable mass in said system movable in two coordinates to change the balance of said system, said coordinates being so related that any unbalance can be corrected by movement of the mass in the proper direction in each coordinate, and means stationary while the system is rotating and reciprocating relative to the means stationary to move said mass in either direction in one coordinate and alternatively to move said mass in either direction in the other coordinate.

2. A balancing mechanism for rotating elements according to claim 1 having a differential with one input driven by the rotatable system, said differential having an output connected to rotate the mass radially in the system, and said differential having a second input connectable to drive the said output, and connections between said output and the rotatable system to move the mass radially and alternatively to move the mass angularly relative to the system.

3. A balancing mechanism for rotating elements according to claim 2 having telescopic connections between the means stationary and the system.

4. A balancing mechanism for rotating elements comprising a rotatable system, movable mass in said system movable in two coordinates to change the balance of the system, said coordinates being so related that any unbalance can be corrected by movement of the mass in the proper direction in each coordinate, means stationary with respect to said system while the system is rotating to move said mass in either direction in one coordinate and alternatively to move said mass in either direction in the other coordinate, a differential with one input driven by the rotatable system, said differential having an output connected to rotate the mass radially in the system, and said differential having a second input connectable to drive the said output, and connections between said output and the rotatable system to move the mass radially and alternatively to move the mass angularly relative to the system.

5. An automatic balancing mechanism for rotating elements comprising a rotatable system, movable mass in said rotatable system movable in two coordinates to change the balance of said system, said coordinates being so related that any unbalance can be corrected by movement of the mass in the proper direction in each coordinate, driving means connectable to the mass to move the mass in one coordinate, said driving means being connectable to the mass to move the mass in the other coordinate, means to connect alternatively the driving means to the mass to move it alternatively in the one coordinate and in the other coordinate, a pickup to record the amplitude of vibration of the system, means connected to the pickup to determine whether the unbalance is increasing or diminishing, and means to reverse the driving means responsive to increase of the unbalance as determined by the means connected to the pickup.

6. An automatic balancing mechanism for rotating elements in accordance with claim 5 having a controller for the driving means to reverse it when the unbalance is increasing, and having a timer connected to the controller to make it responsive to the means connected to the pickup only at intervals.

7. An automatic balancing mechanism for rotating elements in accordance with claim 6 in which the means responsive to the means connected to the pickup to reverse the driving means includes a friction clutch and actuating means which moves it in one direction when the unbalance is increasing and in the other direction when the unbalance is diminishing.

8. An automatic balancing mechanism for rotating elements in accordance with claim 7 in which the pickup is an electric pickup, said balancing mechanism having also an amplifier connected to said electric pickup and a detector to produce a signal, and having also electric means to measure the signal, and in which the means responsive to the means connected to the pickup reverses the driving means when the signal is increasing.

9. An automatic balancing mechanism for rotating elements in accordance with claim 8 in which the electric means to measure the signal includes a movable element which moves in one direction when the unbalance is increasing and in the other direction when it is decreasing, and the means responsive to the means connected to the pickup is a mechanically movable element and an electric switch connected to be operated thereby.

10. An automatic balancing mechanism for rotating elements in accordance with claim 5 in which the means to reverse the driving means includes a friction clutch and actuating means which moves it in one direction when the unbalance is increasing and in the other direction when the unbalance is diminishing.

11. An automatic balancing mechanism for rotating elements in accordance with claim 10 in which the pickup is an electric pickup, said balancing mechanism having also an amplifier connected to said electric pickup and a detector to produce a signal, and having also electric means to measure the signal, and in which the means to reverse the driving means reverses the driving means when the signal is increasing.

12. An automatic balancing mechanism for rotating elements in accordance with claim 11 in which the electric means to measure the signal includes a movable element which moves in one direction when the unbalance is increasing and in the other direction when it is decreasing, and the means to reverse the driving means is a mechanically movable element and an electric switch connected to be operated thereby.

13. An automatic balancing mechanism for rotating elements in accordance with claim 5 in which the pickup is an electric pickup, said balancing mechanism having also an amplifier connected to said electric pickup and a detector to produce a signal, and having also electric means to measure the signal, and in which the means to reverse the driving means reverses the driving means when the signal is increasing.

14. An automatic balancing mechanism for rotating elements in accordance with claim 13 in which the electric means to measure the signal includes a movable element which moves in one direction when the unbalance is increasing and in the other direction when it is decreasing, and the means to reverse the driving means is a mechanically movable element and an electric switch connected to be operated thereby.

15. An automatic balancing mechanism for rotating elements in accordance with claim 5 having a controller for the driving means to reverse it when the unbalance is increasing, and having a timer connected to the controller to make it responsive to the means connected to the pickup only at intervals and in which the pickup is an electric pickup, said balancing mechanism having also an amplifier connected to said electric pickup and a detector to produce a signal, and having also electric means to measure the signal, and in which the means to reverse the driving means reverses the driving means when the signal is increasing.

16. An automatic balancing mechanism for rotating elements in accordance with claim 15 in which the electric means to measure the signal includes a movable element which moves in one direction when the unbalance is increasing and in the other direction when it is decreasing, and the means to reverse the driving means is a mechanically movable element and an electric switch connected to be operated thereby.

17. In a balancing mechanism for rotating elements, a rotatable element having a cylindrical surface and means to rotate said element, a pickup member having a mating cylindrical surface in close but slipping engagement with the cylindrical surface of the rotatable element, means preventing the pickup member from rotating when the rotatable element rotates, means to measure the amplitude of vibration of the pickup member as the rotatable element rotates, a mass in the form of a ring rotatable with the rotatable element, first means to move the ring in one coordinate relative to the rotatable element, second means to move the ring in anoother coordinate relative to the rotatable element, means alternatively connecting the first means and the second means to the ring, and means responsive to the means to measure the amplitude of vibration to cause the means which is connected to move the ring to move it in the direction to diminish the unbalance.

18. In a balancing mechanism for a rotating system, a rotatable element and means to rotate it, a mass connected to said rotatable element movable in a direction to change the balance of the system when it rotates, a driving mechanism connected to the mass to move it, a reversible motor connectable to actuate the driving mechanism, pickup means responsive to vibration of the system due to unbalance thereof, amplitude of vibration measuring means connected to the pickup, means connected to the measuring means registering whether the amplitude is increasing or decreasing, and means operated by the means registering for reversing the motor when the amplitude is increasing.

19. A balancing mechanism for a rotating system according to claim 18 having an intermittently operated device for making the means operated by the means registering operable to reverse the motor only at predetermined intervals.

20. A balancing mechanism for rotating systems comprising a rotatable system and means to rotate it, a balancing mass in the system, means operable from outside the system for moving the mass radially in and relative to the system, means operable from outside the system for moving the mass angularly in and relative to the system, and a differential having an input connection to the system, said differential having an output connectable to the balancing mass, and said differential having an input to move the balancing mass relative to the system.

21. A balancing mechanism according to claim 20 having a clutch connectable in one position to cause the mass to move only radially responsive to the output to move the mass and connectable in another position to cause the mass to move only angularly responsive to the output to move the mass.

22. A balancing mechanism according to claim 21 in which the system includes a shaft and the balancing mass is a ring around the shaft.

23. A balancing mechanism according to claim 20 in which the system includes a shaft and the balancing mass is a ring around the shaft.

24. A balancing mechanism for rotating elements comprising a rotatable system and means to rotate it, a balancing mass in said system, cam means in the system to move the mass radially, a differential outside of the system, said differential having a first input and having a second input and having an output, a connection between the output and the cam means, a connection between the rotatable system and the first input to actuate the differential, a balancing drive connected to the second input for balancing, a rotatable device in the system governing the angular position of the mass, and a two position clutch operable alternatively in a first position to connect the device to the system and operable in a second position to connect the device to the connection between the output and the cam means, the differential having such gear ratios that with the clutch in the first position the cam means rotates relative to the system as and only as the balancing drive operates while the device is held non-rotatively relative to the system and the differential having such gear ratios that with the clutch in the second position both the cam means and the device rotate relative to the system as and only as the balancing drive operates, whereby in the first position of the clutch to move the mass radially relative to the system and in the second position of the clutch to move the mass angularly relative to the system.

25. A balancing mechanism according to claim 24 having automatic means to shift the clutch back and forth from the first position to the second position and to the first position and so on at intervals.

26. A balancing mechanism according to claim 25 having a motor to operate the balancing drive, unbalance increasing and decreasing registering apparatus, and means to reverse the motor responsive to unbalance increasing.

27. A balancing mechanism according to claim 24 having a motor to operate the balancing drive, unbalance increasing and decreasing registering apparatus, and means to reverse the motor responsive to unbalance increasing.

28. Vibration registering apparatus comprising a system and means to introduce kinetic energy into the system, means responsive to the mechanical vibration in said system which comprises a position sensitive transducer, an amplifier and a detector means responsive to said means responsive to mechanical vibrations comprising a mechanically variable element having a parameter of the same kind as the means responsive to mechanical vibration, comparison means responsive to the algebraic difference between the output of the means responsive to mechanical vibration and the output of the mechanically variable element, and actuating means responsive to said means responsive to the algebraic difference to adjust said mechanically variable element to a condition of equality with the output of said means responsive to mechanical vibration, whereby the position of said mechanically variable element registers the amplitude of vibration of said system.

29. Apparatus as claimed in claim 28 in which said position sensitive transducer comprises an externally excited bidirectional alternating current suppressed carrier mechanical-electrical modulator, a source of excitation current, and phase sensitive detector means.

30. Vibration registering apparatus comprising a system having a rotatable shaft, means to introduce kinetic energy into the system, means responsive to the mechanical vibration in said system which comprises a position sensitive transducer, an amplifier and a detector, means responsive to said means responsive to mechanical vibrations comprising a mechanically variable element having a parameter of the same kind as the means responsive to mechanical vibration, comparison means responsive to the algebraic difference between the output of the means responsive to mechanical vibration and the output of the mechanically variable element, and actuating means responsive to said means responsive to the algebraic difference to adjust said mechanically variable element to a condition of equality with the output of said means responsive to mecahnical vibration, whereby the position of said mechanically variable element registers the amplitude of vibration of said system.

31. Apparatus as claimed in claim 30 in which said position sensitive transducer comprises a self-generating strain sensitive element.

32. Apparatus as claimed in claim 30 in which said means responsive to mechanical vibration comprises a velocity sensitive transducer, an amplifier and a detector.

33. Apparatus as claimed in claim 32 in which said velocity sensitive tranducer comprises a permanent magnet core piece moving along its magnetic axis and along the axis of a pair of coaxial solenoidal windings connected additively whereby the instantaneous output voltage of the windings is proportional to the instantaneous velocity of the core piece relative to the windings.

34. Vibration registering apparatus according to claim 30 in which the mechanically variable element is a potentiometer.

35. Vibration registering apparatus according to claim 34 in which the comparison means is a summing resistor.

36. Vibration registering apparatus according to claim 35 in which the actuating means comprises a servo amplifier, a servo motor and mechanical gearing.

37. Vibration registering apparatus according to claim 36 in which the means responsive to mechanical vibration comprises a non-rotating ring closely fitting on said shaft and an electro-mechanical transducer connected to said ring.

38. Vibration registering apparatus according to claim 30 in which the comparison means is a summing resistor.

39. Vibration registering apparatus according to claim 38 in which the actuating means comprises a servo amplifier, a servo motor and mecahnical gearing.

40. Vibration registering apparatus according to claim 39 in which the means responsive to mechanical vibration comprises a non-rotating ring closely fitting on said shaft and an electro-mechanical transducer connected to said ring.

41. Vibration registering apparatus according to claim 30 in which the actuating means comprises a servo amplifier, a servo motor and mechanical gearing.

42. Vibration registering apparatus according to claim 41 in which the means responsive to mechanical vibration comprises a non-rotating ring closely fitting on said shaft and an electro-mechanical transducer connected to said ring.

43. Vibration registering apparatus according to claim 30 in which the actuating means comprises a servo amplifier, a servo motor and mechanical gearing and in which the mechanically variable element is a potentiometer.

44. Vibration registering apparatus according to claim 43 in which the means responsive to mechanical vibration comprises a non-rotating ring closely fitting on said shaft and an electro-mechanical transducer connected to said ring.

45. Vibration registering apparatus comprising a system and means to introduce kinetic energy into the system, means responsive to mechanical vibration in said system constructed to register the amplitude of said vibration, a motor, a friction clutch driven by said motor, and a switch operated by said clutch, said motor clutch and switch being collectively responsive to said means responsive to mechanical vibration constructed to indicate whether the amplitude is increasing or decreasing.

46. Vibration registering apparatus according to claim 45 in which the means responsive to mechanical vibration comprises an electro-mechanical transducer, an amplifier therefor, a detector for the output thereof, a variable voltage source subtractively connected to the detector output, said source having a movable element therein as a component thereof, a servo motor and amplifier therefor responsive to the difference between the outputs of the detector and of the voltage source, and mechanical means connecting said servo motor to the movable element, whereby the movable element is driven to a position proportional to the amplitude of said vibration.

47. Vibration registering apparatus according to claim 45 in which the system comprises a rotatable shaft and the kinetic energy is energy of rotation.

48. Vibration registering apparatus according to claim 47 in which the means responsive to mechanical vibration comprises an electro-mechanical transducer, an amplifier therefor, a detector for the output thereof, a variable voltage source subtractively connected to the detector output, said source having a movable element therein as a component thereof, a servo motor and amplifier therefor responsive to the difference between the outputs of the detector and of the voltage source, and mechanical means connecting said servo motor to the movable element, whereby the movable element is driven to a position proportional to the amplitude of said vibration.

49. Controlling apparatus comprising mechanical means for registering a variable parameter, and means for indicating whether said parameter is increasing or decreasing comprising a two state signalling element, and a friction clutch connecting said signalling element to said mechanical means whereby when said clutch slips in a direction corresponding to increasing variable parameter said signalling element is caused to assume one of said states and when said clutch slips in the opposite direction said signalling element is caused to assume the other of said states.

50. Controlling apparatus according to claim 49 in which the signalling element is a switch.

51. Controlling apparatus according to claim 50 in which the mechanical means includes a transducer, an amplifier, a detector, a mechanically variable element having a voltage output, a servo amplifier and servo motor responsive to the difference in output voltages between said detector and said variable element, said servo motor being connected by gearing to said mechanically variable element and to said friction clutch.

52. Controlling apparatus according to claim 49 in which the mechanical means includes a transducer, an amplifier, a detector, a mechanically variable element having a voltage output, a servo amplifier and servo motor responsive to the difference in output voltages between said detector and said variable element, said servo motor being connected by gearing to said mechanically variable element and to said friction clutch.

References Cited in the file of this patent

UNITED STATES PATENTS

| | | |
|---|---|---|
| 1,876,527 | Thearle et al. | Sept. 6, 1932 |
| 2,118,770 | Sivertsen | May 24, 1938 |
| 2,241,637 | Ernst et al. | May 13, 1941 |
| 2,687,215 | Armstrong | Aug. 24, 1954 |

FOREIGN PATENTS

| | | |
|---|---|---|
| 679,912 | Great Britain | July 2, 1952 |